United States Patent
Petrovic et al.

(10) Patent No.: US 8,086,170 B2
(45) Date of Patent: Dec. 27, 2011

(54) SATELLITE SIGNAL FREQUENCY TRANSLATION AND STACKING

(75) Inventors: Branislav Petrovic, San Diego, CA (US); Dale Hancock, San Diego, CA (US); Jeremy Goldblatt, San Diego, CA (US); Keith Bargroff, San Diego, CA (US)

(73) Assignee: RF Magic, Inc., San Diego, CA (US)

( * ) Notice: Subject to any disclaimer, the term of this patent is extended or adjusted under 35 U.S.C. 154(b) by 923 days.

(21) Appl. No.: 12/016,998

(22) Filed: Jan. 19, 2008

(65) Prior Publication Data

US 2008/0178227 A1    Jul. 24, 2008

Related U.S. Application Data

(63) Continuation of application No. 11/934,715, filed on Nov. 2, 2007, now abandoned.

(60) Provisional application No. 60/864,352, filed on Nov. 3, 2006, provisional application No. 60/885,814, filed on Jan. 19, 2007, provisional application No. 60/886,933, filed on Jan. 28, 2007.

(51) Int. Cl.
*H04H 20/74* (2008.01)

(52) U.S. Cl. ............ 455/3.02; 455/3.01; 455/13.3; 455/22

(58) Field of Classification Search .......... 455/3.01, 455/3.02, 13.3, 22
See application file for complete search history.

(56) References Cited

U.S. PATENT DOCUMENTS

| | | | |
|---|---|---|---|
| 5,073,930 A | | 12/1991 | Green |
| 5,276,904 A | | 1/1994 | Mutzig et al. |
| 5,959,592 A | * | 9/1999 | Petruzzelli ............ 725/68 |
| 6,005,515 A | * | 12/1999 | Allen et al. ............ 342/374 |
| 6,424,817 B1 | | 7/2002 | Hadden et al. |
| 6,600,730 B1 | * | 7/2003 | Davis et al. ............ 370/343 |
| 6,763,223 B1 | * | 7/2004 | Hirabayashi et al. ....... 455/3.02 |
| 6,823,170 B1 | * | 11/2004 | Dent ............ 455/13.3 |

(Continued)

FOREIGN PATENT DOCUMENTS

EP    0 800 314    10/1997

(Continued)

OTHER PUBLICATIONS

The International Search Report from corresponding PCT application PCT/US2007/089192, Date Sep. 21, 2008.

*Primary Examiner* — Nay Maung
*Assistant Examiner* — Richard Chan
(74) *Attorney, Agent, or Firm* — Bruce W. Greenhaus; Clifford Perry

(57) ABSTRACT

An outdoor satellite receiving unit (ODU) receives several independent satellite signals, selects two signals with a switch matrix, downconverts the two signals to a bandstacked signal with a high and a low band signal, and outputs the bandstacked signal on the same cable to receiver units. Several satellite signals can be selected in groups of two or more and output to independent receiver units. Signal selecting is performed at the received radio frequency (RF) and bandstacking is performed with a single downconversion step to an intermediate frequency (IF). Channel stacking on the same cable of more than two channels from several satellites can be achieved by using frequency agile downconverters and bandpass filters prior to combining at the IF output. A slow transitioning switch minimizes signal disturbances when switching and maintains input impedance at a constant value.

8 Claims, 24 Drawing Sheets

U.S. PATENT DOCUMENTS

| | | | |
|---|---|---|---|
| 6,832,071 B1 * | 12/2004 | Nakamura et al. | 455/3.02 |
| 6,985,695 B1 * | 1/2006 | Kato | 455/3.02 |
| 7,130,576 B1 | 10/2006 | Gurantz et al. | |
| 2003/0199246 A1 * | 10/2003 | Friedman et al. | 455/3.01 |
| 2004/0029549 A1 * | 2/2004 | Fikart | 455/323 |
| 2004/0209584 A1 | 10/2004 | Bargroff et al. | |
| 2004/0235415 A1 | 11/2004 | Atarashi | |
| 2004/0259497 A1 * | 12/2004 | Dent | 455/13.3 |
| 2006/0277578 A1 * | 12/2006 | Goldblatt et al. | 725/68 |
| 2008/0132193 A1 * | 6/2008 | Petrovic et al. | 455/323 |

FOREIGN PATENT DOCUMENTS

| | | |
|---|---|---|
| EP | 1 089 469 | 4/2001 |
| WO | WO 02/51015 | 6/2002 |
| WO | 2005109703 A | 11/2005 |
| WO | 2006119397 A | 11/2006 |

\* cited by examiner

SATELLITE SIGNAL FREQUENCY TRANSLATION AND STACKING

RELATED APPLICATIONS

This application is a continuation application of U.S. non-provisional application Ser. No. 11/934,715, filed Nov. 2, 2007, entitled "Satellite signal frequency translation and stacking," incorporated herein by reference, said Ser. No. 11/934,715 non-provisional application claiming the benefit of U.S. provisional application No. 60/864,352 filed Nov. 3, 2006, entitled "Satellite signal frequency translation and stacking", incorporated herein by reference, U.S. provisional application No. 60/885,814 filed Jan. 19, 2007 entitled "Circuits, Systems and Methods for Constructing a Composite Signal", incorporated herein by reference, and U.S. provisional application No. 60/886,933 filed Jan. 28, 2007 entitled "Circuits, Systems and Method for Frequency Translation and Signal Distribution", incorporated herein by reference.

BACKGROUND OF THE INVENTION

1. Field of the Invention

The present invention relates generally to satellite receiver systems, and in particular, to signal distribution of multiple satellite signals.

2. Background of the Related Art

In modern and competitive TV delivery systems it is necessary to provide customers with the ability to simultaneously and independently tune to and receive any of the available TV channels from a multiplicity of satellites transmitting transponder channels. In a typical satellite system, a frequency band may have two different signal polarizations, thus delivering the multiplicity of transponder channels through the multiplicity of satellite paths simultaneously on the same frequency band. A multiplicity of different TV appliances, such as TV sets, set-tops, personal video recorders (PVRs), digital video recorders (DVRs) and other devices need to receive different TV programs simultaneously in different rooms in one household (the "whole-home video" or "watch and record" capability), or in a multiplicity of households in the case of multiple-dwelling units. It is a challenge to provide the capability of reception of any channel from any path on multiple tuners in different receive appliances simultaneously and independently. This problem of enabling each tuner to independently tune to any channel from either polarization of any satellite has been resolved in the prior art by the means of frequency "band translation switch" (BTS) technology as well as "channel-stacking switch" (CSS) technology utilizing secondary frequency conversion, as described below.

FIG. 1 shows a typical block diagram of a satellite band translation system of the prior art for use with two satellites, providing two outputs, each feeding a dual channel tuner (or two individual tuners). Each antenna receives two signals of different polarizations, typically having channel frequencies offset by half-channel width or having the same channel frequencies. In direct broadcast satellite (DBS) applications, the polarization is typically circular, having right-hand (R1 and R2) and left-hand (L1 and L2) polarized signals as labeled in FIG. 1. Signals can also be linearly polarized with horizontal and vertical polarizations.

The received signals are processed in a well known low noise block-converter (LNB) 8 consisting of low noise amplifiers 7, which typically comprise 2 or 3 amplifiers in a cascade, filters 9, which typically comprise bandpass filters providing image rejection and reducing out of band power, and frequency converter block 10. The converter block 10, performing frequency downconversion, contains local oscillators LO1 14 and LO2 12 typically of the dielectric-resonator oscillator (DRO) type, mixers, and post-mixer amplifiers. The two mixers driven by LO1 downconvert the signals to one frequency band (lower, L) while the mixers driven by LO2 downconvert to a different frequency band (higher, H). The L and H frequency bands are mutually exclusive, do not overlap, and have a frequency guard-band in between. The L and H band signals are then summed together in a separate combiner 16 in each arm, forming a composite signal having both frequency bands, "L+H", which is often referred to as a "band-stacked signal", which is then coupled to a 2×4 matrix switch/converter block 20.

The matrix switch 30 routes each of the two input signals to selected one or more of the 4 outputs, either by first frequency converting the signals in the mixers 28 driven by LO3 32 or directly via the bypass switches around the mixers. The controls for the switch and mixer bypass are not shown in the figure. The frequency of the LO3 is chosen such that the L-band converts into the H band, and vice versa, which is referred to as the "band-translation". This is accomplished when the LO3 frequency is equal to the difference of the LO2 and LO1 frequencies. The band-translation is a second mixing and frequency conversion operation performed on the received satellite signal, after the first frequency conversion operation performed in the LNB.

The outputs of the matrix switch/converter block 20 are coupled through diplexers consisting of a high-pass filter 22, low-pass filter 24 and a combiner 26, with two similar paths providing two dual tuner outputs 18 and 34. The filters 22 and 24 remove the undesired portion of the spectrum, i.e. the unwanted bands in each output. Each of the two outputs 18 and 34 feeds a dual tuner set top box (STB) via a separate coaxial cable, for a total capability of 4 tuners in STBs. By controlling the matrix switch routing and the mixer conversion/bypass modes, a frequency translation is accomplished and each of the 4 tuners can independently tune to any of the channels from either polarization of either satellite.

FIG. 2 is a prior art block diagram of a satellite band translation system receiving two satellites like FIG. 1, but with additional capability of receiving and processing an external input signal 36. In FIG. 2 an exemplary case of a common Ku band radio frequency (RF) downlink frequency band as well as a standard intermediate frequency (IF) band is shown. In the example, the downlink Ku frequency band 12.2 GHz to 12.7 GHz is downconverted to a standard satellite IF frequency range 950-2150 MHz by mixing with two local oscillators LO1 and LO2. The LO1 frequency is 11.25 GHz, downconverting the right-hand polarized signal R1 to a low band 950 MHz to 1450 MHz (L) and LO2 is 14.35 GHz, downconverting the left-hand polarized signal L1 to a high band 1650 MHz to 2150 MHz (H). Combining the two, a band-stacked composite signal ("L+H") is formed, spanning from 950 MHz to 2150 MHz, with a guard band 200 MHz wide in the middle. The same is repeated for the other two signals, R2 and L2. The external input signal 36 comes already converted and band-stacked in the standard IF range 950-2150 MHz, typically from another antenna/LNB. A 3×4 matrix switch 38 is used in order to multiplex the additional external input signal with the other two internal signals.

FIG. 3 is a block diagram of a satellite band translation system of the prior art for receiving input from two satellites and supporting one external input like FIG. 2, but providing one more output, for a total of three outputs capable of independently feeding three dual tuners. To accommodate increased number of output ports, a larger matrix switch of a 4×6 size is used.

These and other prior art systems, while accomplishing the goal of independent tuning of multiplicity of tuners, achieve that by employing a secondary frequency conversion, effectively adding one more conversion to the conversion already occurring in the LNB, thus not only increasing the complexity, but potentially degrading the signal quality as well. Furthermore, if the switch-over in the matrix switch creates a transient and results in a change of level and phase of the received signal, interruption and temporary loss of service can occur at the affected port.

U.S. Pat. No. 6,408,164 issued to Lazaris-Brunner et al entitled "Analog Processor for Digital Satellites", incorporated herein by reference, describes an analog processor for use with digital satellites. The patent discloses a system that consists of a receiver block that performs a frequency down-conversion, an N×M Switch Matrix, followed by another frequency down-conversion.

U.S. Pat. No. 7,130,576 issued to Gurantz et al entitled "Signal Selector and Combiner for Broadband Content Distribution", incorporated herein by reference, describes a processor for use with digital satellites. The patent discloses a system that consists of low noise block converters (LNBs) that perform a frequency down-conversion, an N×M Switch Matrix, followed by another frequency down-conversion.

The prior art leaves room for improvements, such as reducing the complexity, power and cost, preserving the phase noise performance as well as addressing the switch-over transient effects thus eliminating the risk of service interruption.

SUMMARY OF THE INVENTION

This invention is a receiving method and apparatus for simultaneous and independent reception by a multiplicity of receivers of the channels carried on the same frequency band but through different, multiple transmission paths by enabling individual receivers to independently tune to any channel on any path. The frequency conversion from received radio frequency (RF) to intermediate frequency (IF) for distribution to set top boxes (STBs) is accomplished with one downconversion. Typically, the invention can be used in a satellite receive system receiving simultaneously from two or more satellites, each satellite input having two different signal polarizations, thus having four or more different signal-carrying transmission paths delivering signals on the same frequency bands.

Several satellite signals are received and amplified. A switch matrix selects two or more signals from among the received RF signals. Switching is preferably performed with switches that maintain constant impedance on the input terminal or provide a slow switching transition to avoid a discontinuity in impedance. The selected signals are down converted and frequency translated to a high or low band-stacked band. The translated signals are combined in pairs to form a band-stacked signal. A single downconversion step is used, thereby reducing complexity, cost, and phase noise. The band-stacked signal feeds tuners in STBs.

The present invention reduces the complexity, cost and size of channel-band frequency translation and stacking by eliminating secondary frequency conversion in the outdoor unit (ODU) and corresponding circuitry. Elimination of the second frequency conversion also helps preserve the quality of the signals.

DETAILED DESCRIPTION OF THE INVENTION

Figure 1:
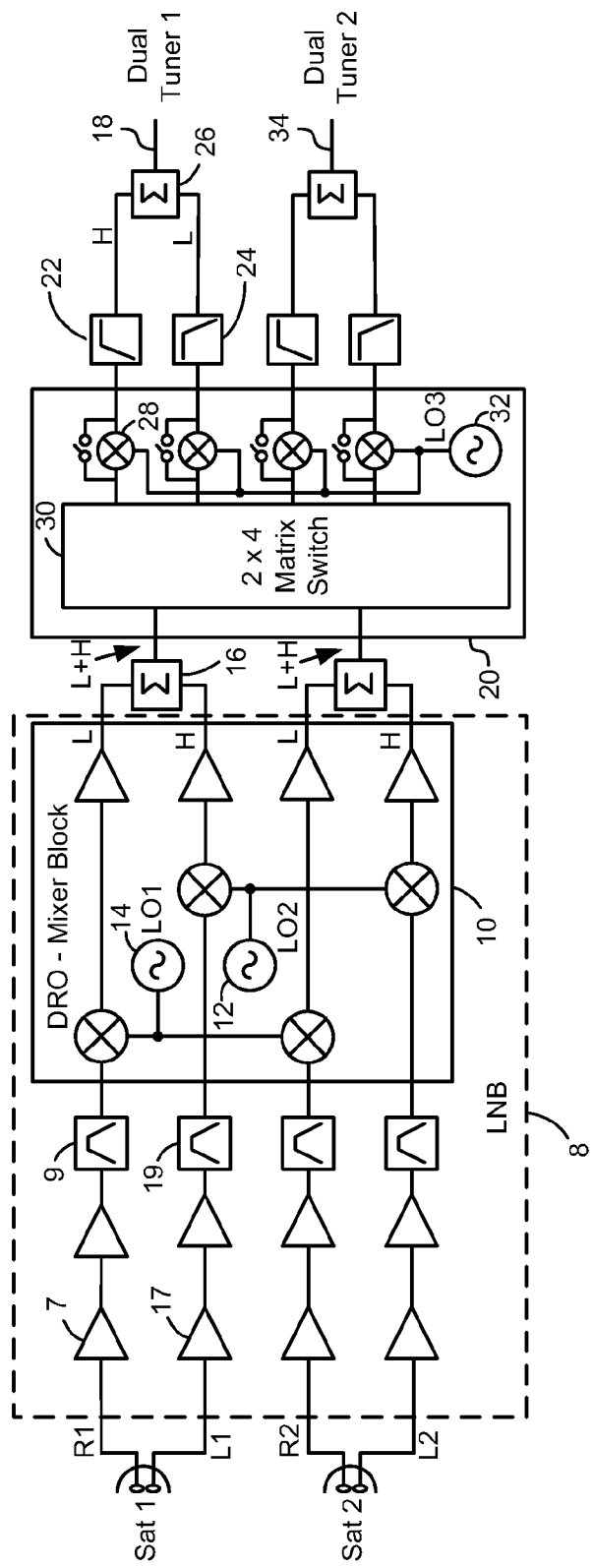
FIG. 1 is a block diagram of a prior art satellite band translation system for receiving input from two satellites.
Figure 2:
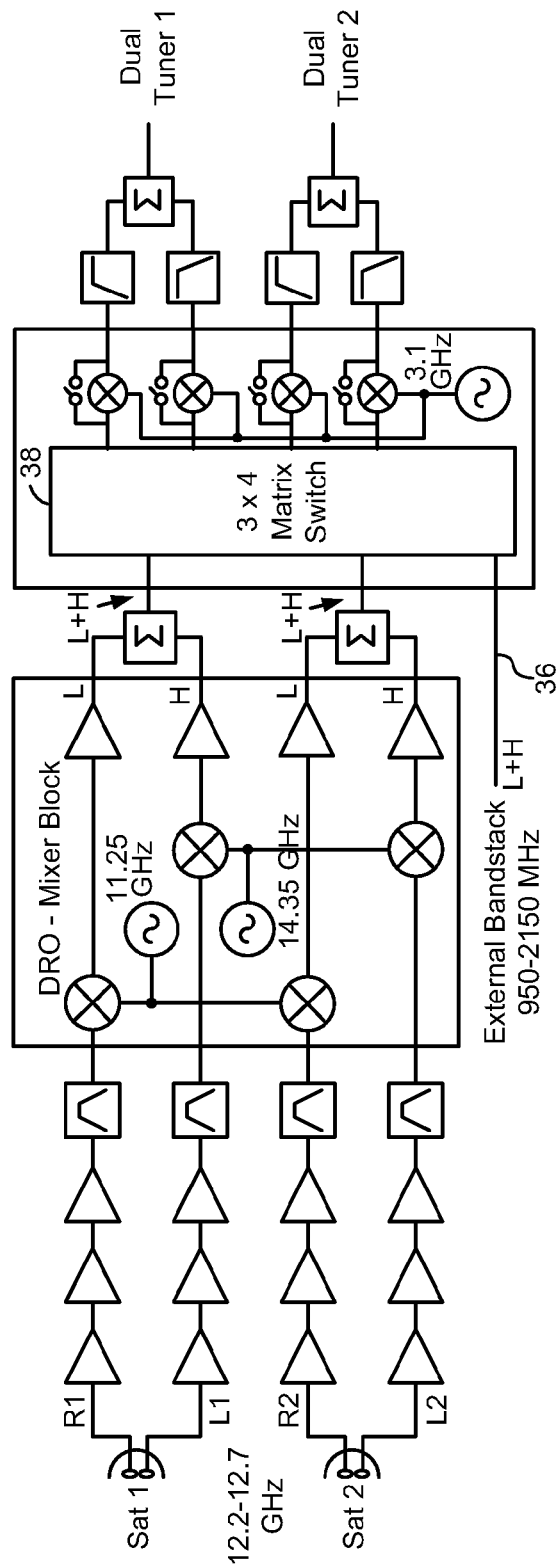
FIG. 2 is a block diagram of a prior art satellite band translation system for receiving input from two satellites with additional capability of receiving and processing an external input signal.
Figure 3:
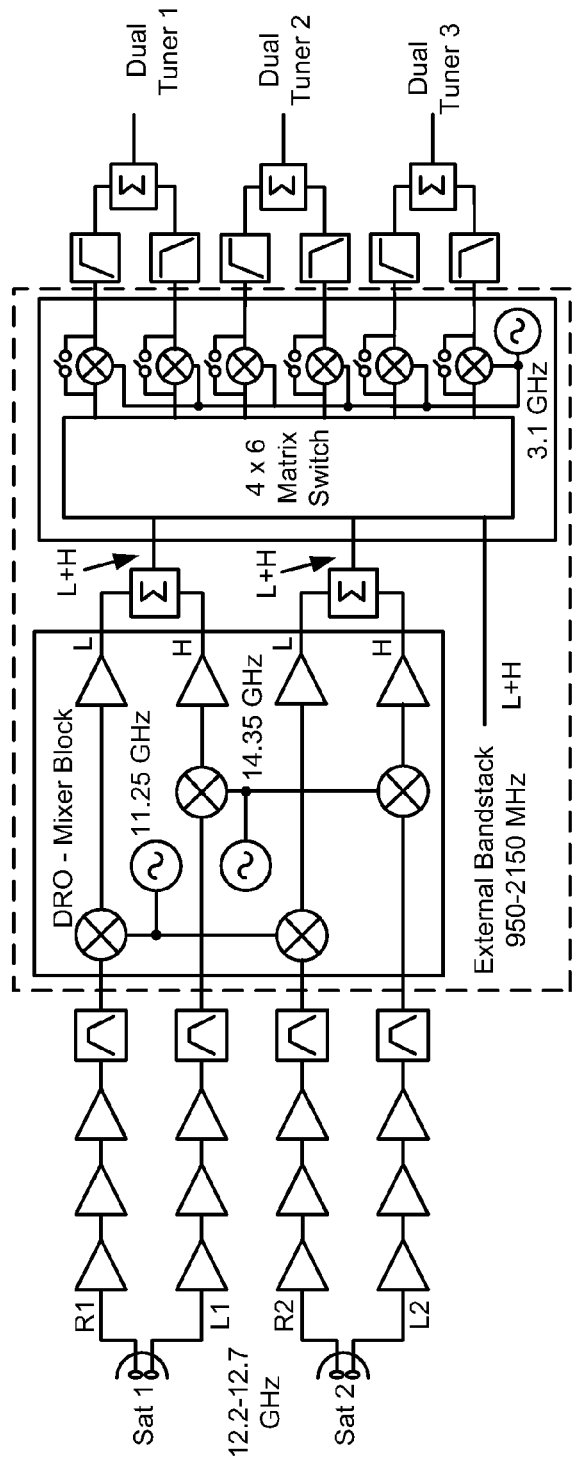
FIG. 3 is a block diagram of a prior art satellite band translation system for receiving input from two satellites, with one external input and a total of three outputs.
Figure 4:
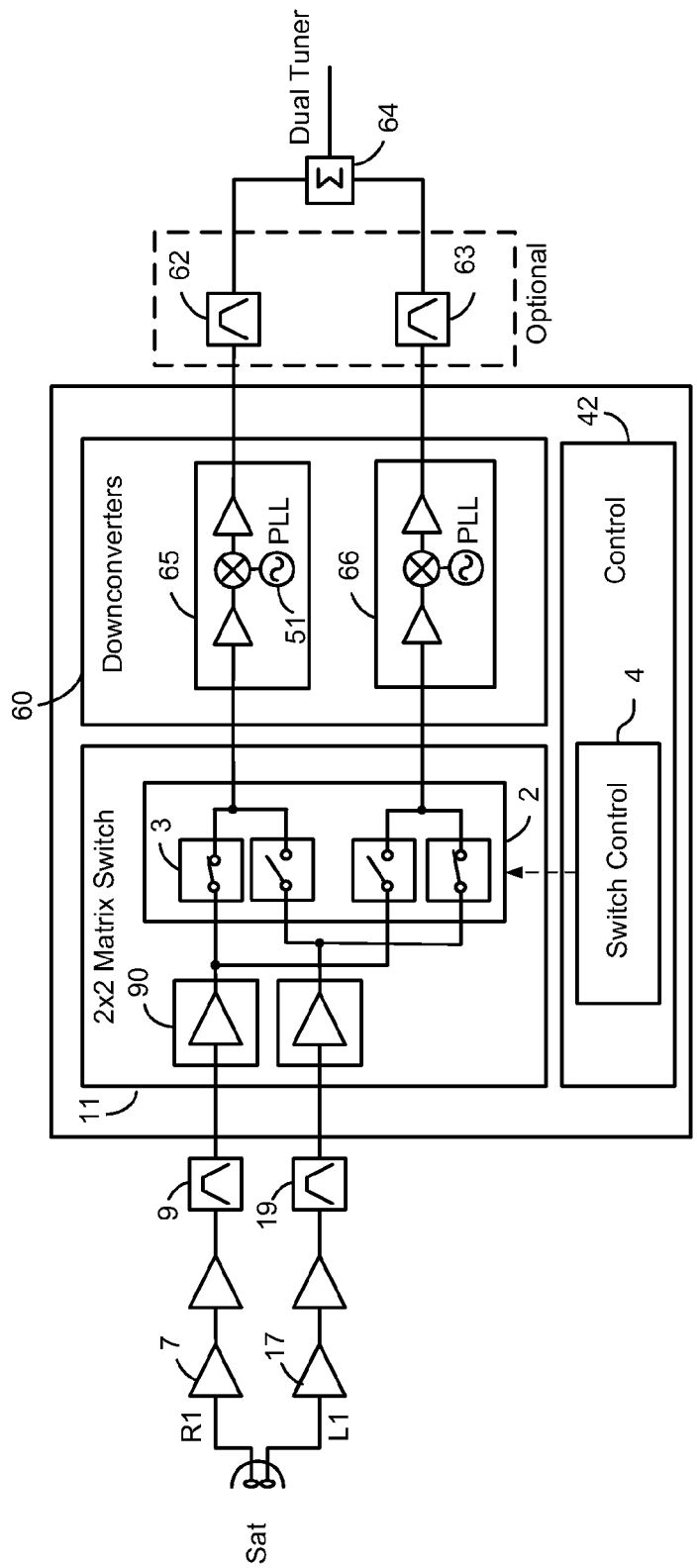
FIG. 4 is a block diagram of one embodiment of the present invention of a satellite channel translation system for one satellite.

FIG. 4 shows a block diagram of one embodiment of the present invention of a satellite channel translation system for one satellite, providing one output containing two channels at different frequencies and feeding a dual channel tuner or two individual tuners. Each tuner is provided with the desired signal from either received polarity, but unlike the prior art circuits, achieves the translation directly without performing a secondary frequency conversion.

The entire switching and routing function is performed at the input frequency ("on-frequency") thus eliminating oscillators, mixers, bypass switches, post-amplifiers, and other circuitry associated with the secondary conversion. This approach simplifies the system as well as improves preservation of the signal integrity. Where it is necessary to minimize the effects of port-to-port cross-talk during the switch-over, the switch control circuit 4 may be used to control the switching timing and the impedance transition of switches 2. This technique is described later.

The on-frequency routing is performed by the matrix switch 11 of the size 2×2 in this example. It contains the input blocks 90 and the switch block 2. Inside the switch block 2 individual switch elements 3 are shown, in exemplary ON or OFF positions. An output of the matrix switch is connected to one source only, while each source can be connected to multiple outputs (providing the same selected program to multiple receivers).

The matrix switch 11 routes the on-frequency input signals coming from the antenna via amplifiers 7 and 17, and filters 9 and 19 to the selected outputs of the switch. The two selected signals from the output of the matrix switch 11 are fed to the frequency converter block 60 with downconverters 65 and 66 for conversion to the IF frequency.

The downconverters 65 and 66 can be fixed tuned or frequency agile (i.e. changeable). For a band translation switch (BTS) function, the LOs inside blocks 65 and 66 would typically be fixed tuned, and for the channel-stacking switch (CSS) application, the LOs are agile. The downconverters may each have an oscillator (a PLL type oscillator 51 is illustrated) or the downconverts may share a single oscillator as shown in downconverter 50 of FIG. 16.

If input RF frequency range or bandwidth (BW) is less than half of the output IF frequency BW (RF BW<½ IF BW), output filters 62 and 63 in general are not required for the BTS function. This is because the entire RF band of one RF input fits in the lower portion of the IF band (low band, L) and the entire band of the other input fits in the upper portion of IF (high band, H). For example, if the satellite frequency range is 12.2-12.7 GHz, i.e. RF BW=500 MHz and IF output has a standard range of 950 MHz-2150 MHz (IF BW=1200 MHz), then the low band can be from 950 MHz to 1450 MHz using a fixed LO frequency of 11.25 GHz and the high band from 1650 to 2150 MHz. These bands do not overlap and filtering is not required. The upper sideband products of the conversion process in downconverters 65 and 66 fall at the LO and RF sum frequencies, which in this case in the 23-27 GHz range. This range is well outside the IF frequency of interest and will typically be attenuated by the natural low pass properties of most subsequent stages and devices, such as combiners, cables and receiving devices. If necessary, a simple "roofing" filter rejecting this frequency band can be used before or after combiner 64.

In the simple case of one satellite (two RF inputs) in FIG. 4, the matrix switch 11 may not be needed if RF BW<½ IF BW because both RF inputs can be simultaneously stacked on one cable. However, for RF bandwidths greater than half of IF bandwidth, the switch 11 is required. For example, the satellite frequency range 10.7 to 12.75 GHz such as some European satellites has RF BW=2.05 GHz, both the switch 11 and filters 62 and 63 are needed.

For more than two IF output channels, channel stacking CSS as opposed to band stacking BTS is used, in which case filtering in the IF is needed. In general, in order to fit a multiplicity of channels into available IF BW, bandpass type filters staggered in frequency are used. For instance in FIG. 22 four outputs are shown, and filters 62 are bandpass types.

The following is a description of a channel stacked (CSS) application of FIG. 4. Optional filters 62 and 63 are used in the channel stacked applications whereas for the band stack application, the filters 62 and 63 generally do not need to be used. The downconverters 65 and 66 are in this case frequency agile and are tuned such that the desired channel frequency of each downconverter falls in the pass band of the respective bandpass filters 62 and 63. The center frequencies of filters 62 and 63 are different and fall within the tuning range of the tuners. The outputs of the filters 62 and 63 are combined together in combiner 64 and passed to the dual tuner. One embodiment of the frequency control of the oscillators is the phase locked loop (PLL). Another embodiment is the frequency locked loop (FLL). Downconverters 65 and 66 can be combined in a single integrated circuit (IC).

The switch control 4 and the frequency control circuitry are contained in block 42. This block is controlled remotely via the same coaxial cable carrying the channels to the receiving devices, but in a reverse direction from an indoor or outdoor control unit or from a set-top box.

Figure 15:
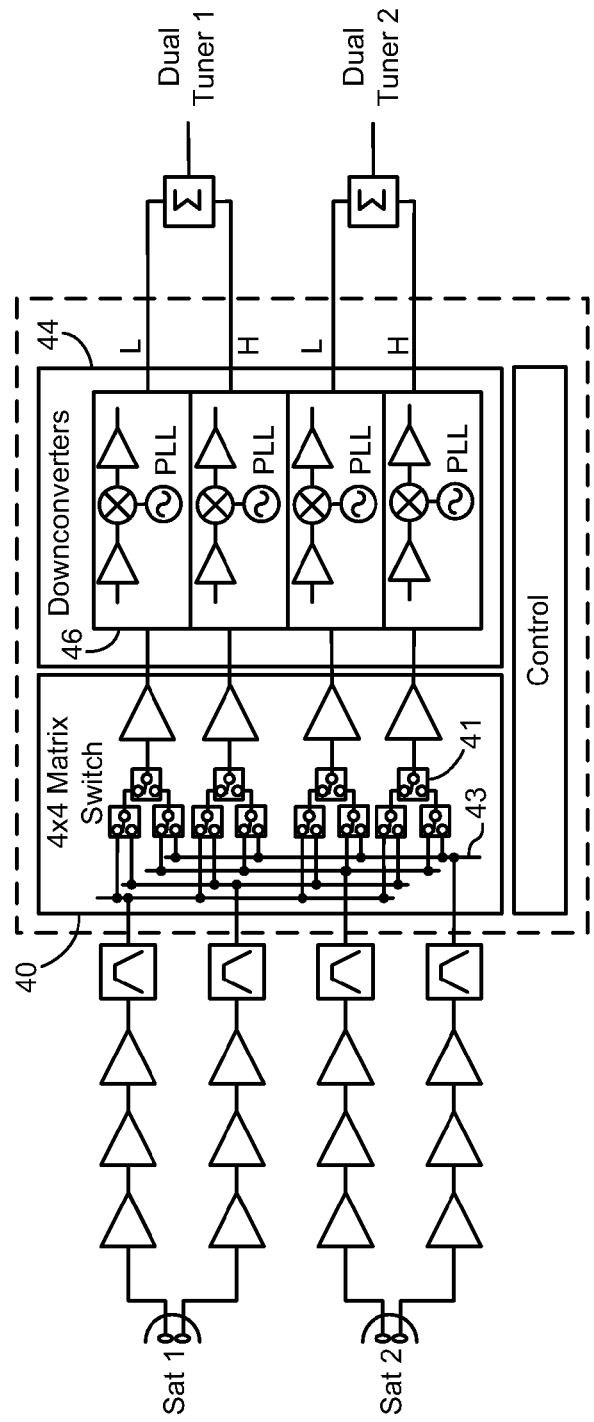
FIG. 15 is a block diagram of one embodiment of the present invention of a satellite band translation system for receiving input from two satellites.

FIG. 15 shows another embodiment of the present invention circuit handling more input and output ports and translating frequency bands rather than channels. This figure shows a block diagram of the present invention of a satellite band translation system for two satellites, providing two outputs, each having two different channels and feeding a dual channel tuner. The circuit performs the entire switching and routing function on-frequency in a similar way as FIG. 4. The on-frequency routing in the circuit of FIG. 15 is performed by the matrix switch 40 having the size of 4×4 in this embodiment. The matrix switch 40 routes the four on-frequency input signals coming from the amplifier chains to selected one or more of the 4 outputs of the switch. The four selected signals from the output of the matrix switch 40 are fed to the downconverter block 44 for conversion to the IF frequency.

Figure 16:
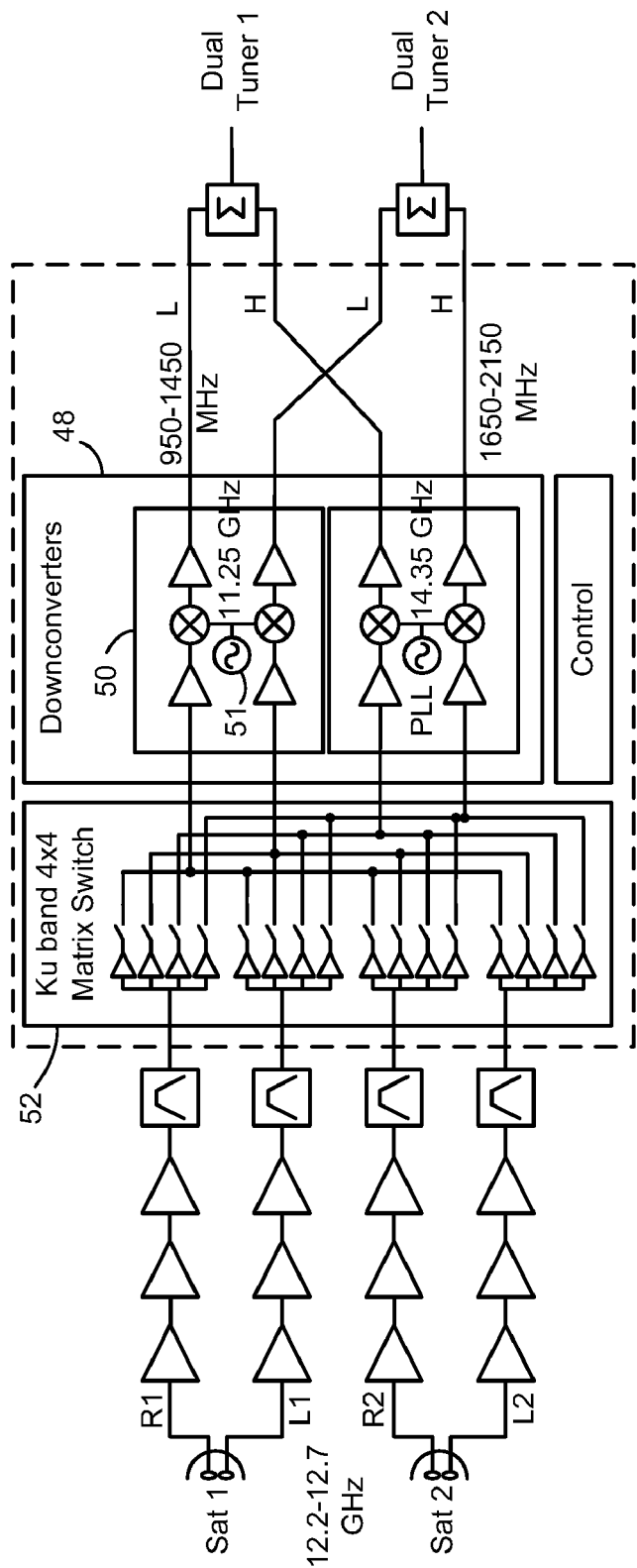
FIG. 16 is a block diagram of an embodiment of the present invention of a satellite band translation system for receiving input from two satellites.
Figure 17:
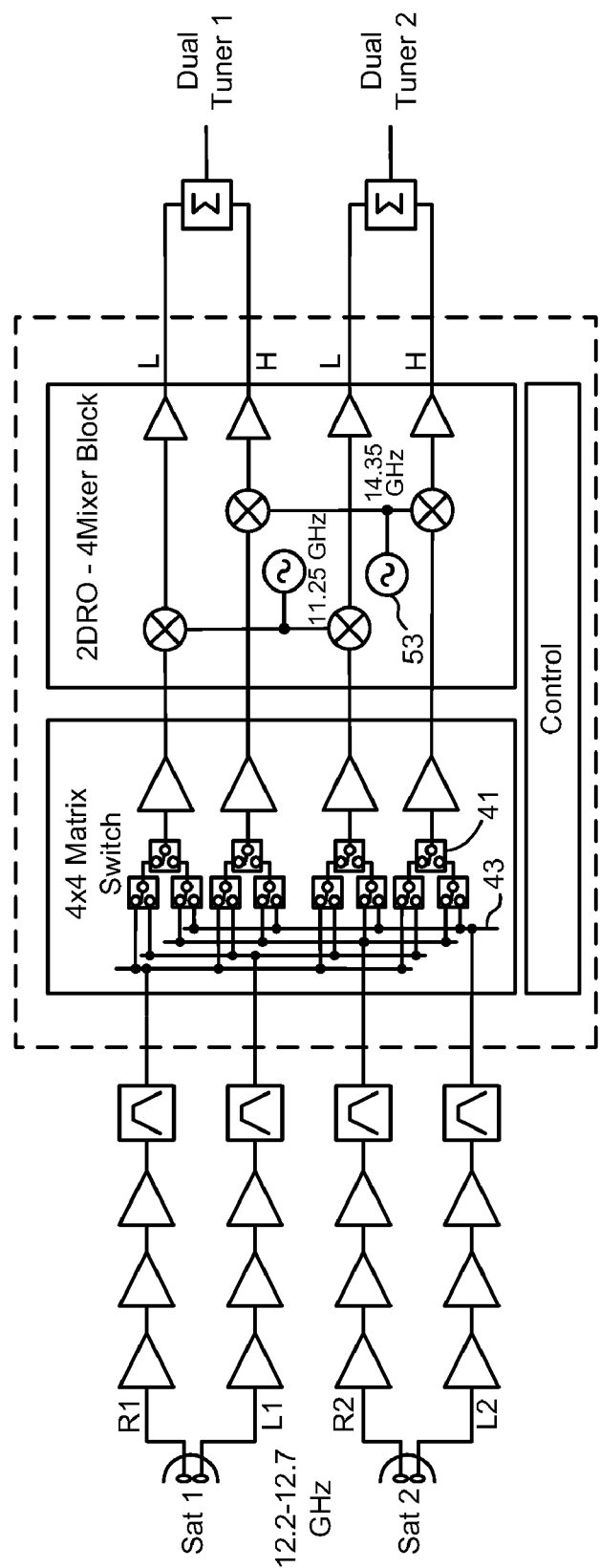
FIG. 17 is a block diagram of an embodiment of the present invention of a satellite band translation system for receiving input from two satellites using DRO type oscillators in the downconverter block.

A total of four downconverters 46 are contained in the block 44 in this embodiment. The number of downconverters is equal to the number of the matrix switch outputs as well as to the number of tuners connected at the output (two dual tuners in this case). One embodiment of the downconverters can be to implement in an integrated circuit, either having each individual downconverter block 46 in a separate IC, or combining two or more downconverter blocks 46 in a single IC. If more than one downconverter is implemented on a single IC some level of LO sharing is possible, as depicted in FIG. 16. Another example of LO sharing is shown in FIG. 17, this time sharing of a discrete DRO type.

The oscillator in each downconverter 46 is tuned to a frequency such that the correct output frequency band L or H is achieved at each output. One embodiment of the frequency control of the oscillators is the phase locked loop (PLL). The downconversion in each block produces only one (desired) band at the output. If the RF BW is less than half of the IF BW, unlike the prior art there is no need for band filtering or diplexing at the output—the two bands L and H are simply combined together in a simple combiner and launched to the cable feeding the tuners. Elimination of the diplexers is another advantage of the present art.

The matrix switch can be an off-the-shelf Microwave Monolithic Integrated Circuit (MMIC) such as the Hittite Microwave Corporation broadband GaAs MESFET MMIC chip. Several IC die can be used in "system in a package" (SIP) implementation. The matrix switch can also be implemented as a discrete solution, for example using PIN diodes on a printed circuit board, or as a combination of discrete and IC components. The matrix switch can also be implemented in a monolithic integrated circuit with the rest of the system of the present invention.

The matrix switch has to achieve sufficient performance in order to meet the system requirements and avoid signal quality degradation. Important performance aspects of the matrix switch are the isolation from port to port when the switch is in steady-state (static isolation or static cross-talk), and the port to port isolation during the switch-over when the switch is transitioning from state to state (dynamic isolation or dynamic cross-talk). Considerations of both static and dynamic isolation of the matrix switch include the signal isolation (signal leakage) aspects and the impedance change effects on signal levels and isolation.

The consideration of static isolation between ports must account for the fact that each port receives the power from all other ports combined, increasing the requirement with increasing number of ports. The signal isolation from each port to the aggregate of all other ports must meet the system budget requirements. In digital satellite applications using QPSK or 8PSK modulation formats, the isolation of one port from the combined signal power of all other ports needs to be on the order of 40 dB to meet the system requirements. To achieve this, the isolation between individual ports must be higher than that by 10 log(N−1), where N is the total number of ports. For the exemplary case of the circuit of FIG. 15 with 4 ports, the port to port isolation must be 5 dB higher (10 log 3), therefore, 45 dB of port to port isolation is required. In the case of more ports, yet higher port to port isolation will be required. Another design aspect of the switch is the effect of the static impedance change, i.e. the difference of the nodal impedance in different switch states. The nodal impedance should remain substantially constant as a function of the state of the switches to minimize the change of the signal level being transmitted through the node.

The dynamic isolation of the matrix switch must be high enough to ensure that the signal transients or impedance change transients induced on one (affected) port during a switch-over of another (offending) port do not disturb the signal reception on the affected port. In general, during a switch over of one port, all other (N−1) ports can be affected, but typically the ports driven by the same source as the one being switched-over are affected more severely. During the transition from an open to a closed state (or vice versa) the impedance of the switch is changing or transitioning from high impedance to low impedance (or vice versa) having some intermediate value during the transition. The switch impedance during the transition affects the impedance of the node to which it is connected thus affecting the signal power and signal phase transfer through the node between the connected devices. Upon settling of the transition, the static impedance may also be different resulting in a static level and phase shift.

One of the methods employed in the present invention to mitigate the impedance change effects during switch-over is to control the speed of the switch-over transition process. Conventional switches do not control the turn-on and turn-off speed but rather let the switch transition at its "natural" speed, primarily determined by propagation and other unintentional delays in the system. This speed is typically very fast, on the order of several tens of nanoseconds, which is of the same order as the symbol time in high speed digital communications. For example, with 25 Msps the symbol time is 40 ns and a glitch during the switch-over of comparable duration can cause short burst errors, which can cause visible or audible artifacts, depending whether the error is recoverable by the error correction in the demodulator.

However, if the fast switch-over is followed by a static shift of level and/or phase of the received signal, more severe consequence of temporary loss of service can occur. The more the impedance of a node changes upon switch-over (consequently causing a larger step change of both the level and the phase of the signal at the node feeding other, non-switched ports) the more likely this is to happen. This is because a step change of the level and phase will not be corrected immediately by the demodulator, but rather only after the AGC and the carrier tracking loop track-out the changes and settle, which may be on the order of milliseconds. During this time the decision levels in the demodulator will be incorrect and long burst errors may occur (e.g. for a 40 ns symbol time, this can mean thousands of erroneous symbols which can disrupt the service).

To solve the switch transient problem, the switch transition is slowed down to allow the carrier tracking loop in the demodulator and the AGC loop to track out the signal change caused by the switching.

Figure 5:
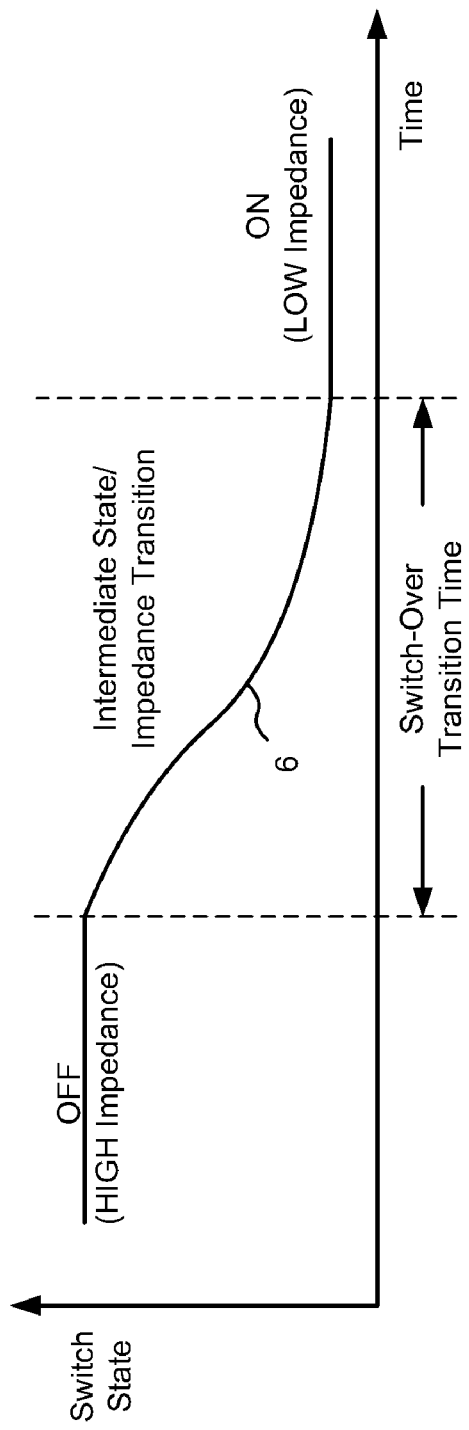
FIG. 5 illustrates the timing diagram of the switch-over transition states of a preferred embodiment of the switch in the present invention.

FIG. 5 shows a timing diagram of the switch-over transition states. Instead of rapidly changing the switch state from ON to OFF (and vice versa), the switching over time, i.e. the duration of the transition region 6, is intentionally sloweddown to allow various loops (such as carrier tracking loop and AGC loop) in the demodulator to track out the switch transients and prevent degradation or loss of reception during the switch over. As depicted by the curve shape in region 6, the rate of the switch impedance change in the present invention is intentionally slowed down. The transition time is adjusted in a controlled way below the symbol rate and below the time constants of both the carrier tracking and the AGC loops, i.e. slower than the reciprocal of the loop bandwidths (1/LBW) of each loop. The non-linear signal distortion while the switch is in the active transition region 6 may be higher compared to the ON or OFF states and in general needs to be accounted for and addressed in the design.

While the above method of the present invention eliminates the service interruption risk due to switch transients and static impedance changes, the method will not however address the effects of static impedance change on signal isolation. The impedance change can manifest itself in reduced port to port signal isolation due to changed nodal voltages and currents. This may be more pronounced when single-ended signal lines are used, as opposed to a case of differential signal lines. This issue is addressed by another method of the present invention which maintains constant impedance both during and after the switch-over. The method is described next.

Figure 6:
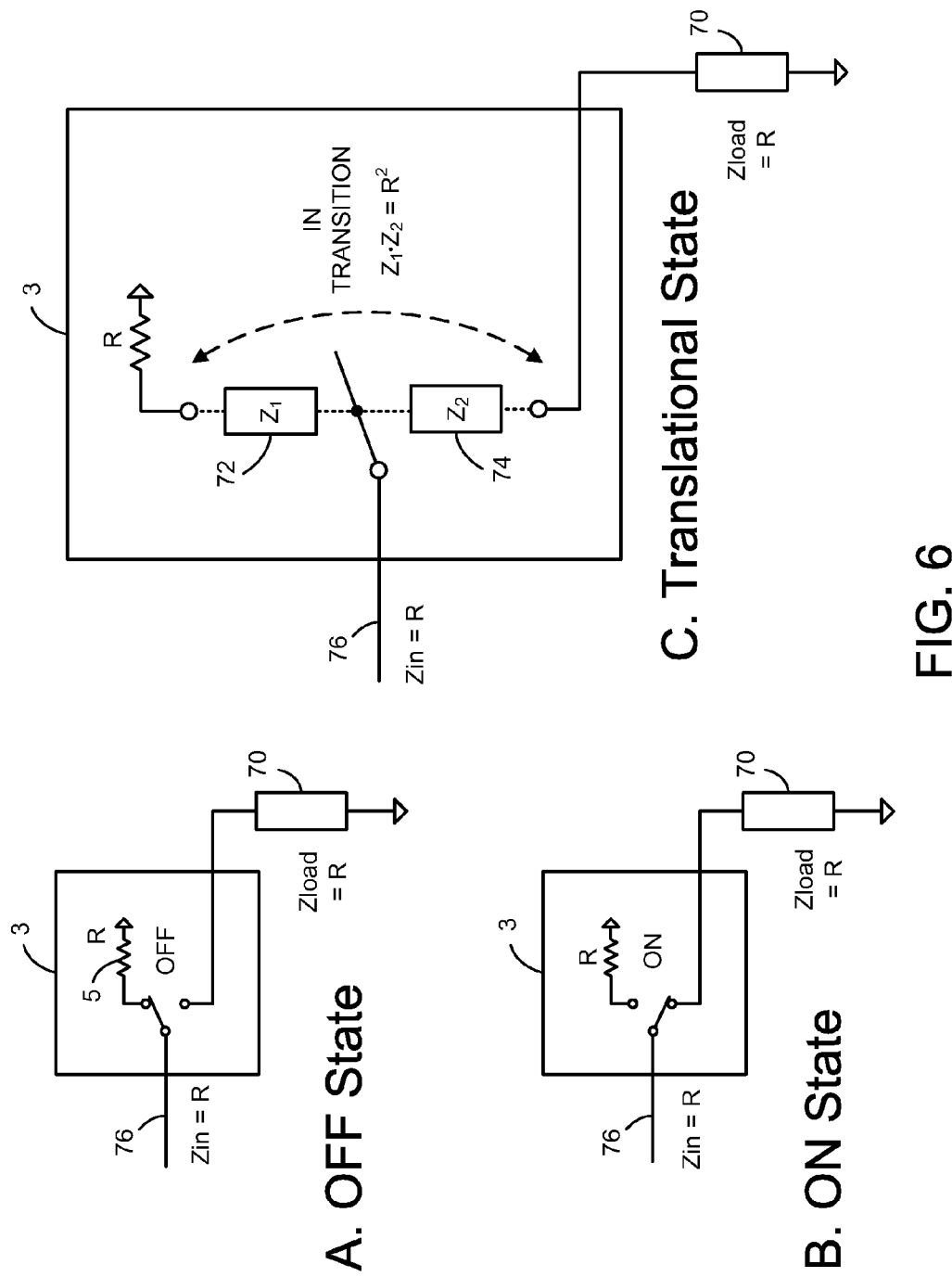
FIG. 6A is a block diagram of a preferred embodiment of the present invention switch shown in OFF state.
FIG. 6B is a block diagram of the switch in FIG. 6A but shown in ON state.
FIG. 6C is a block diagram of the switch in FIG. 6A and FIG. 6B shown in the intermediate, transitional state, when the arm is moving from ON to OFF position or vice versa.
Figure 7:
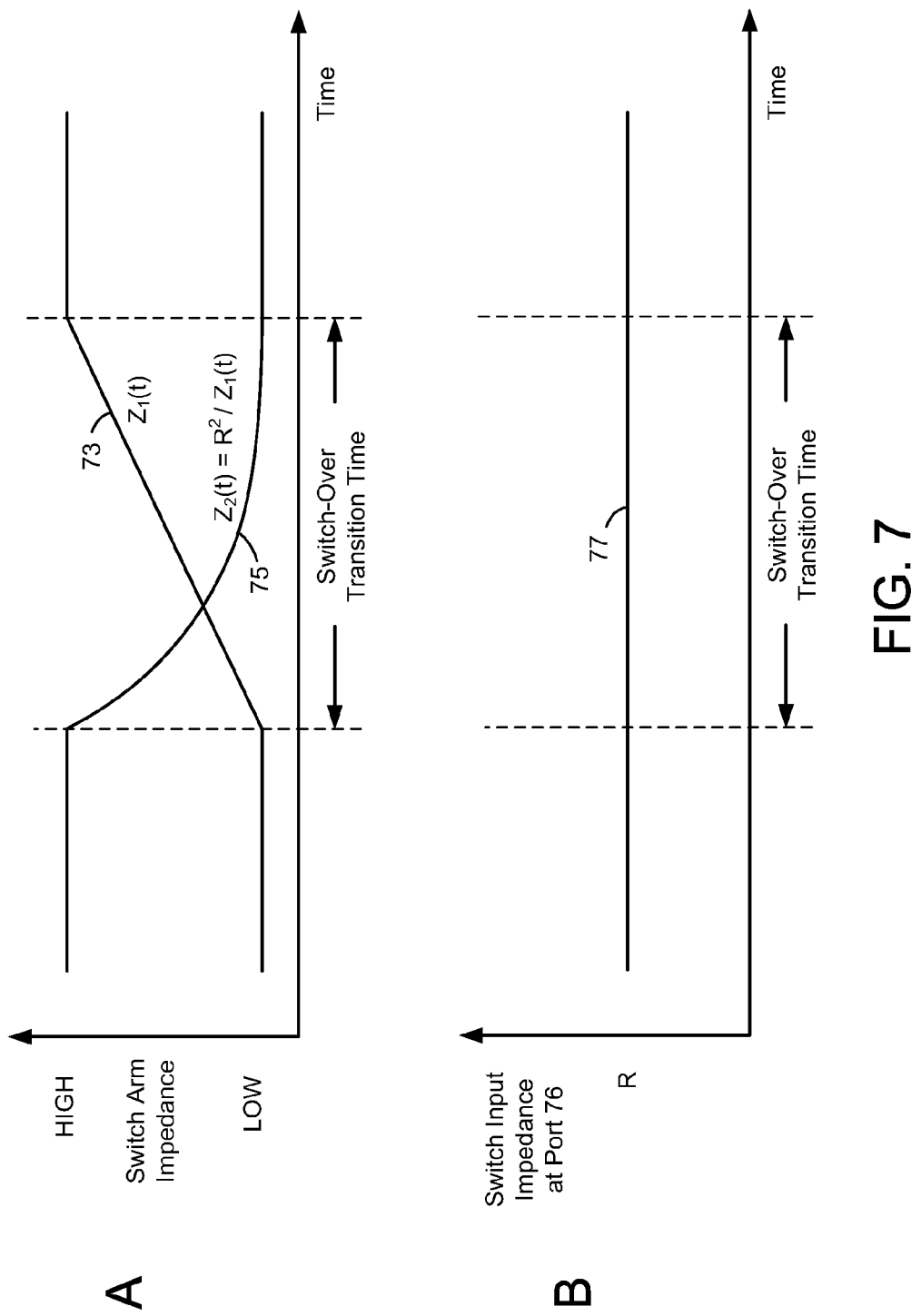
FIG. 7A is an example of the timing diagram of the switch-over transition state of the switch of FIG. 6C where a constant product of the impedances of the two arms of the switch is attained, i.e. $Z_1 \cdot Z_2 = R^2$.
FIG. 7B is the input impedance of the switch in transition of FIG. 6C, which is constant and equal to system impedance R when the impedances of the two arms of the switch change per FIG. 7A, i.e. when $Z_1 \cdot Z_2 = R^2$.

FIG. 6 and FIG. 7 illustrate the constant impedance switching method. With the switching method of the present invention, a constant input impedance is attained, i.e. impedance matching of the switch at the input is achieved in all three states (ON, OFF and in-transition). The preferred embodiment of the switch element 3 is of the single pole double throw (SPDT) type with an internal termination. In the OFF position as shown in FIG. 6A, the switch connects the input port 76 to the internal termination 5 having a value R. In this state, the input impedance of the switch at 76 (presented to its source) is Zin=R. In the ON position, illustrated in FIG. 6B, the input impedance at 76 equals the load impedance 70 connected at the output of the switch, which is also R.

The situation when the switch is in transition (the arm moving from ON to OFF position or vice versa) is shown in FIG. 6C. In this intermediate, transitional state, impedance $Z_1$ 72 and impedance $Z_2$ 74 represent the impedances of the two arms of the switch. One impedance changes from low to high and the other from high to low as the switch changes the position during the transition time. It can be shown that if the product of the two impedances is maintained constant and equal to $R^2$, i.e. if the following equation is satisfied:

$$Z_1 \cdot Z_2 = R^2 \quad (1)$$

then the input impedance at 76 will also be constant, i.e. it will be matched to R.

Unlike the input port, the impedance matching at the output port of the switch will not be maintained as the switch changes states. Because the output port in this process is being switched to another source, i.e. to another service which interrupts the original service by definition, it is not necessary to maintain the impedance matching at the output during switch transitions. The matching at the output will be restored upon switching-in of the other source.

FIG. 7A is an example of the impedance when the condition of equation (1) is met; in actual implementation, the product of $Z_1$ and $Z_2$ will approximately equal $R^2$ due to factors such as component and environmental variations. The impedance $Z_1$ is chosen to change linearly with time, while $Z_2$ changes hyperbolically as $R^2/Z_1$. With this condition the goal of constant input impedance is achieved, as shown on FIG. 7B by a constant impedance line 77 at R. The choice of linear change of $Z_1$ versus time was made for illustration purposes only—any other choice satisfying equation (1) will achieve the same goal.

In any particular implementation of this method, the impedance $Z_1$ 72 and impedance $Z_2$ 74 will be designed in conjunction with the characteristics of the switch elements and the switch control block 4. The switch control block 4 has a timing control circuit that generates a time varying control signal having a controllable rate of change that results in the desired impedance values of the impedances $Z_1$ and $Z_2$ at a given time.

Figure 8:
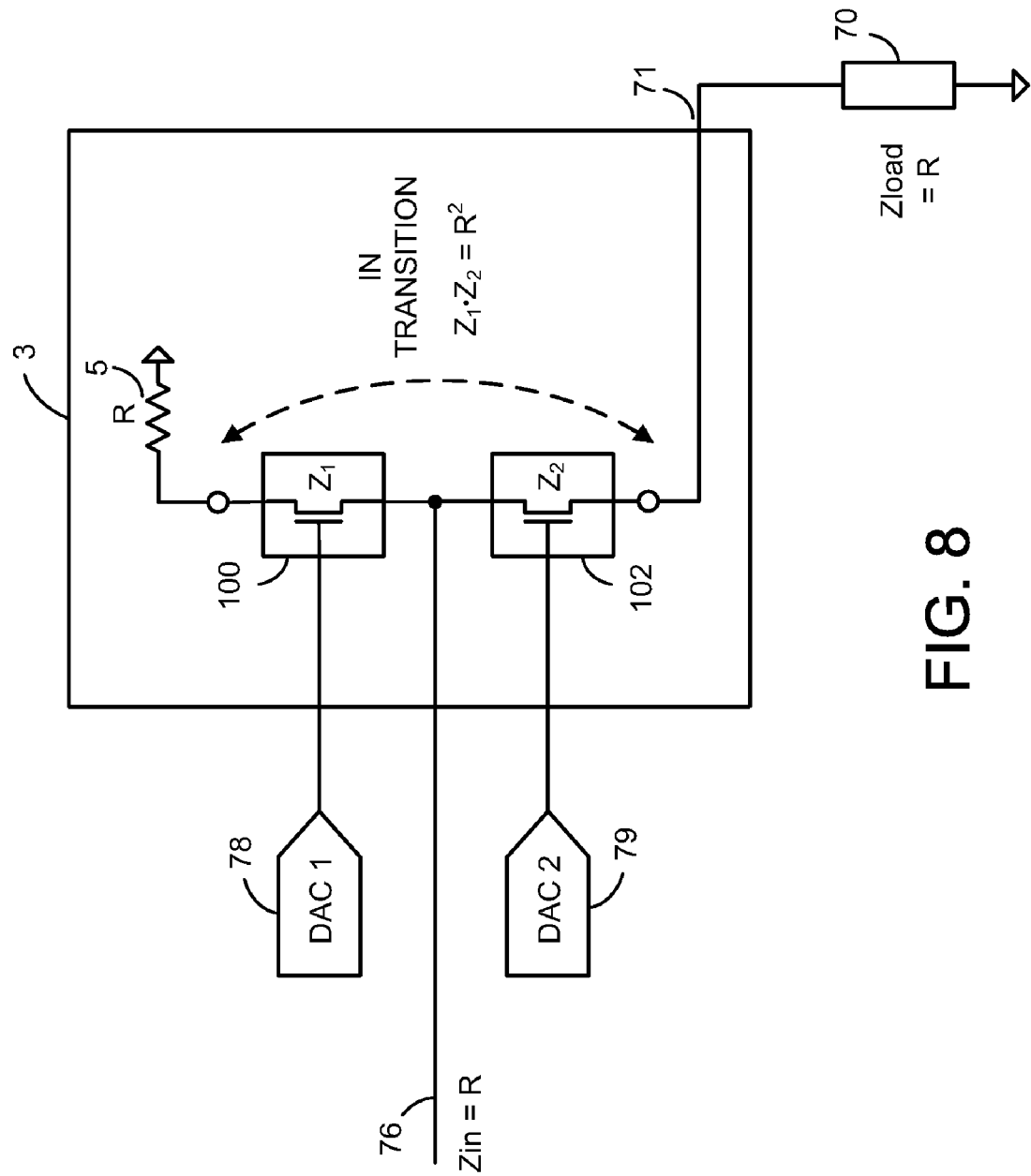
FIG. 8 is a simplified block diagram of a preferred embodiment of the present invention switch using FET switching elements controlled by digital-analog converters (DACs).

FIG. 8 is a simplified block diagram of an embodiment of the present invention switch using FET switching elements 100 and 102. In this embodiment, the switches are controlled by digital to analog converters 78 (DAC1) and 79 (DAC2), respectively. To achieve the impedance relationship of the FET switches 100 and 102 meeting the requirement of equation (1), the DAC1 and DAC2 generate ramp voltages of certain complementary profiles, as required based on the impedance characteristics of the FET elements. The DACs digital control is generated in the control block 4 shown in FIG. 4.

The actual switch circuitry will typically use a multiplicity of FET switches, having series and shunt elements to achieve the required performance. If desired accuracy of the controlled transitional impedances of the switches cannot be achieved with two DACs, more DACs can be used in order to approximate equation (1) with greater precision.

Figure 9:
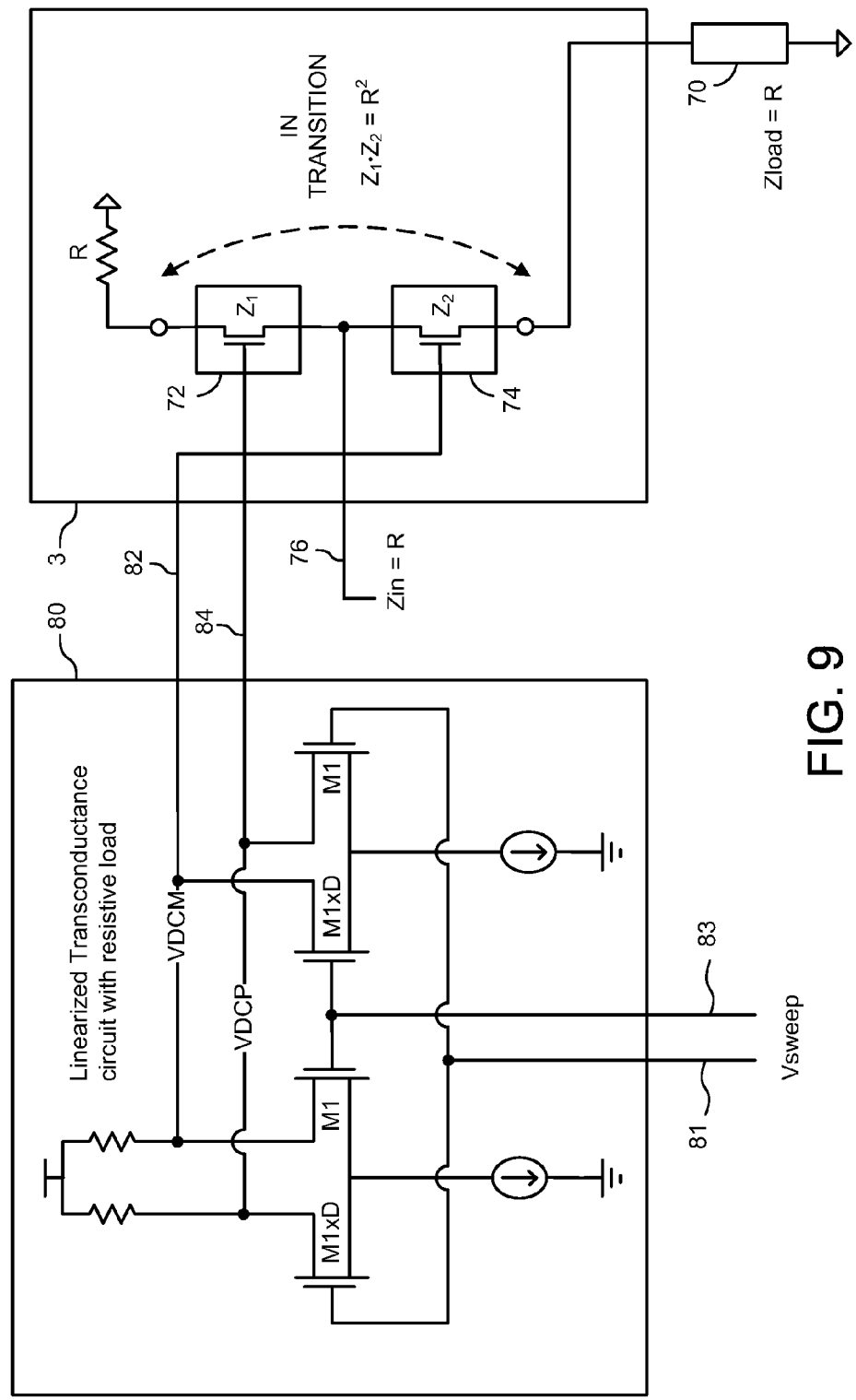
FIG. 9 is a simplified block diagram of a preferred embodiment of the present invention switch using FET switching elements as in FIG. 8 but controlled by a linearized transconductance circuit having a resistive load.

FIG. 9 shows another embodiment of the switch control of the present invention. It is a simplified block diagram of the present invention switch using FET switching elements as in FIG. 8 but controlled by a linearized transconductance circuit 80 having a resistive load. During switch-over, circuit 80 is driven by a differential sweep signals 81 and 83 which produce complementary control voltages VDCM 82 and VDCP 84 driving the FET switches 74 and 72, respectively.

Figure 10:
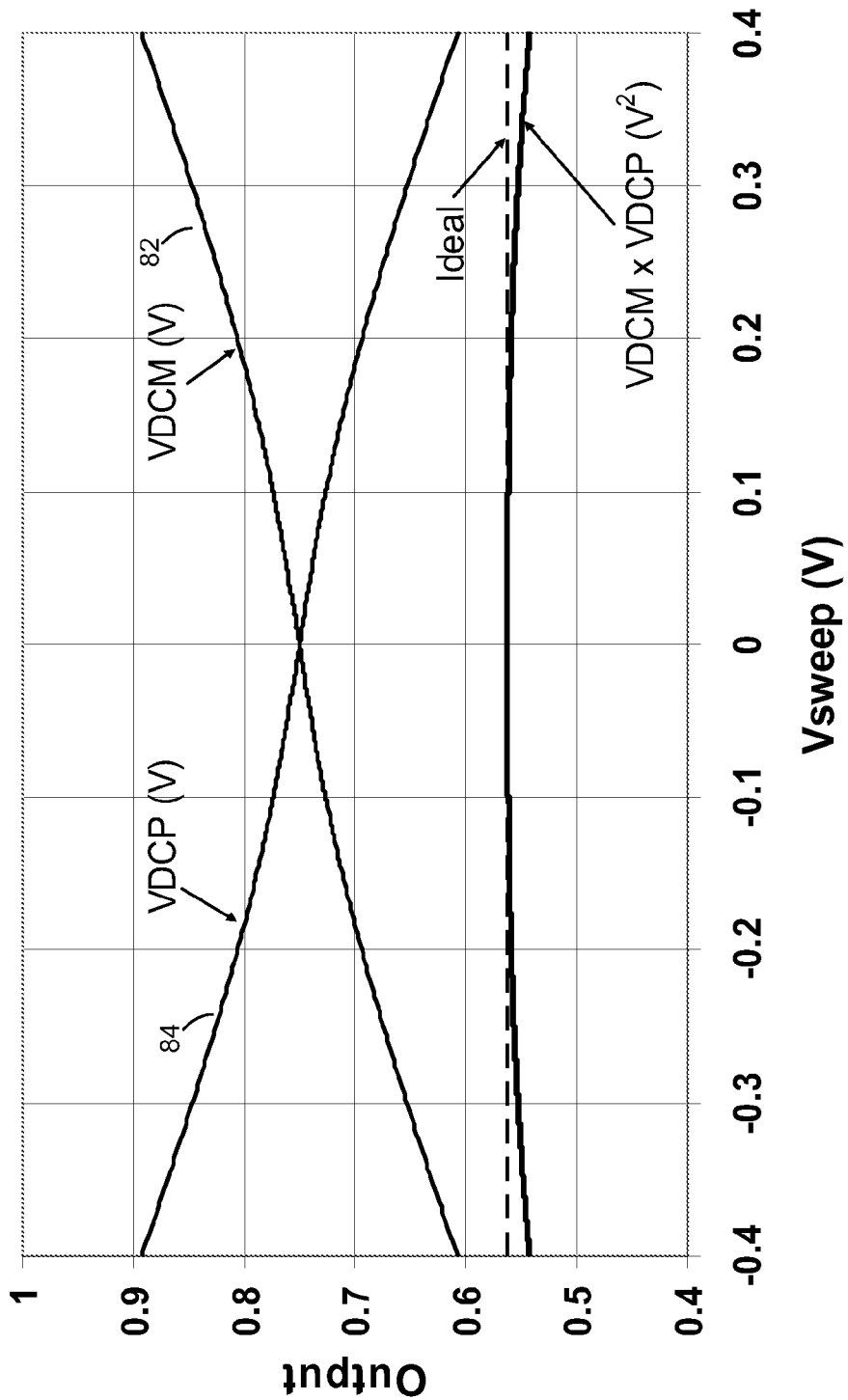
FIG. 10 is a diagram of control voltages of the switch-over transition state of the switch of FIG. 9 achieving nearly constant product of the impedances of the two arms of the switch, i.e. $Z_1 \cdot Z_2 \approx R^2$.

FIG. 10 is a diagram of the control voltages 82 and 84 during the switch-over transition state. As shown in the diagram, the product of the two controlled voltages VDCM and VDCP is nearly constant, which translates to a nearly constant impedance product of the two FET switches 74 and 72, which is the goal as earlier described in order to achieve a constant input impedance, i.e. the input matching.

With the help of the equations below it can be explained why the constant product of the control voltages translates to a constant impedance product. The impedance of the FET in active region can be expressed by the following approximate equation:

$$1/Ron \approx K \cdot W/L \cdot (VGS - Vt - VDS) \quad (2)$$

where Ron is the FET impedance, W and L are the gate width and length, respectively, K is a constant, VGS is the gate to source control voltage, Vt is the threshold voltage, and VDS is the drain to source voltage.

Assuming VDS≈0 and substituting control voltages VDCP=VGS−Vt when Ron is impedance $Z_1$ and VDCM=VGS−Vt when Ron is impedance Z2, the following expressions for the FET switch impedances Z1 and Z2 are obtained:

$$1/Z_1 \approx K \cdot W/L \cdot VDCP \quad (3)$$

$$1/Z_2 \approx K \cdot W/L \cdot VDCM \quad (4)$$

Multiplying equation (3) with equation (4) yields:

$$Z_1 \cdot Z_2 \approx 1/[(K \cdot W/L)^2 \cdot (VDCP \cdot VDCM)] \approx \text{constant} \quad (5)$$

Since the product VDCP·VDCM is approximately constant, from equation (5) it follows that the product $Z_1 \cdot Z_2$ is also constant. Adjusting the K·W/L such that Ron=R at the zero crossing of the differential sweep signal 81/83, the following expression follows:

$$Z_1 \cdot Z_2 \approx R^2 \quad (6)$$

i.e. the target condition of equation (1) is met with switch 3 of FIG. 9.

In general, a "break before make" switching is desirable and often necessary. With this type of switching order, the connected path is first completely disconnected or switched-off and only then the new path is connected or switched-in. This is often necessary in order to prevent possible degradation of the signal isolation as well as impedance mismatch during transition if two switches connected to the same node are switching-over at the same time. The proper timing of the switching is achieved with the switch timing control from block 4.

Figure 11:
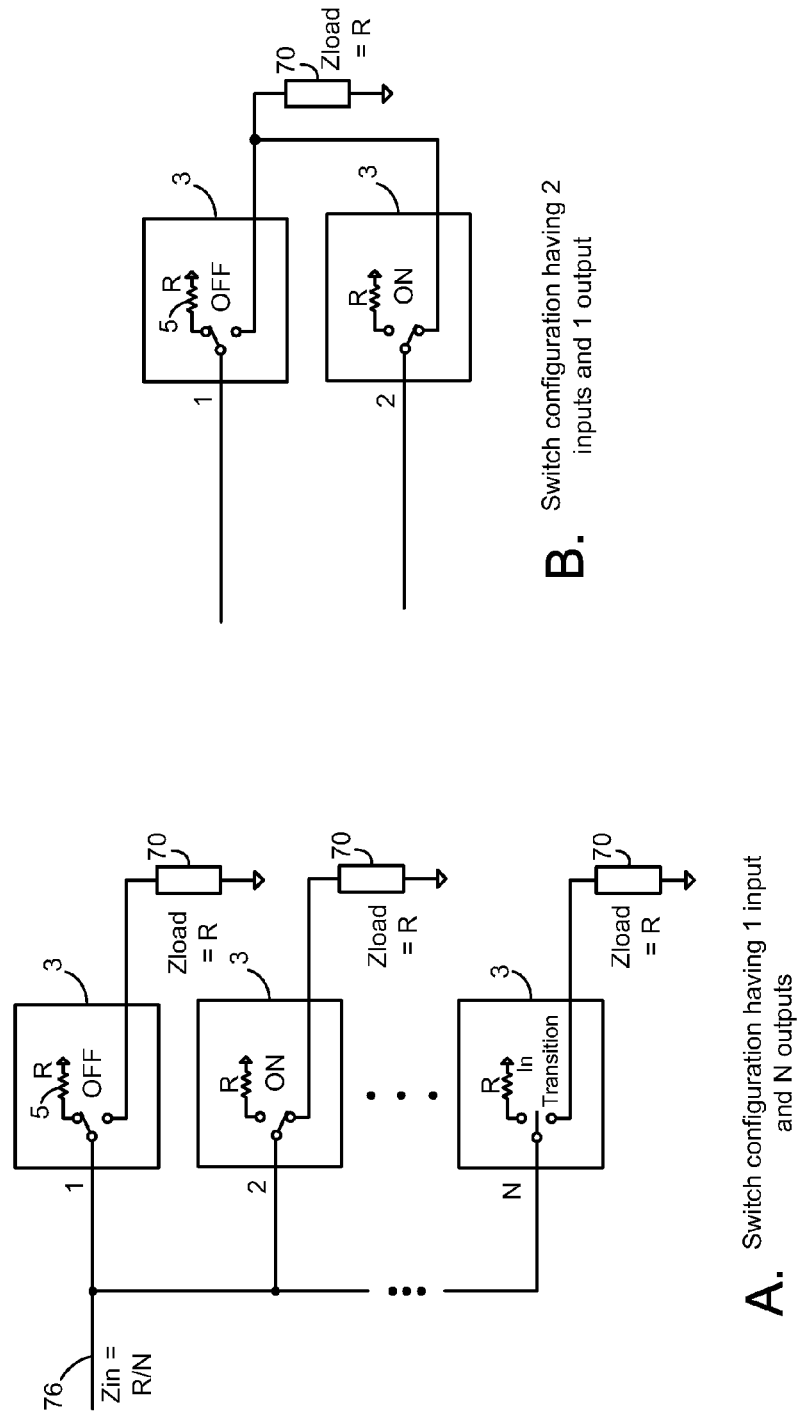
FIG. 11A is a block diagram of a multiplicity of the present invention switches connected to the same input. The input impedance gets reduced by the factor equal to the number of switches.
FIG. 11B is a block diagram of two switches configured for a two input, one output arrangement.

FIG. 11A is a block diagram of a multiplicity of switches connected to the same input. In this case, the input impedance is divided by the number of switches (N), as determined by the number of required outputs: Zin=R/N. For larger values of N, the input impedance can become too low.

FIG. 11B is a block diagram of two switches configured for a two input, one output arrangement.

Figure 12:
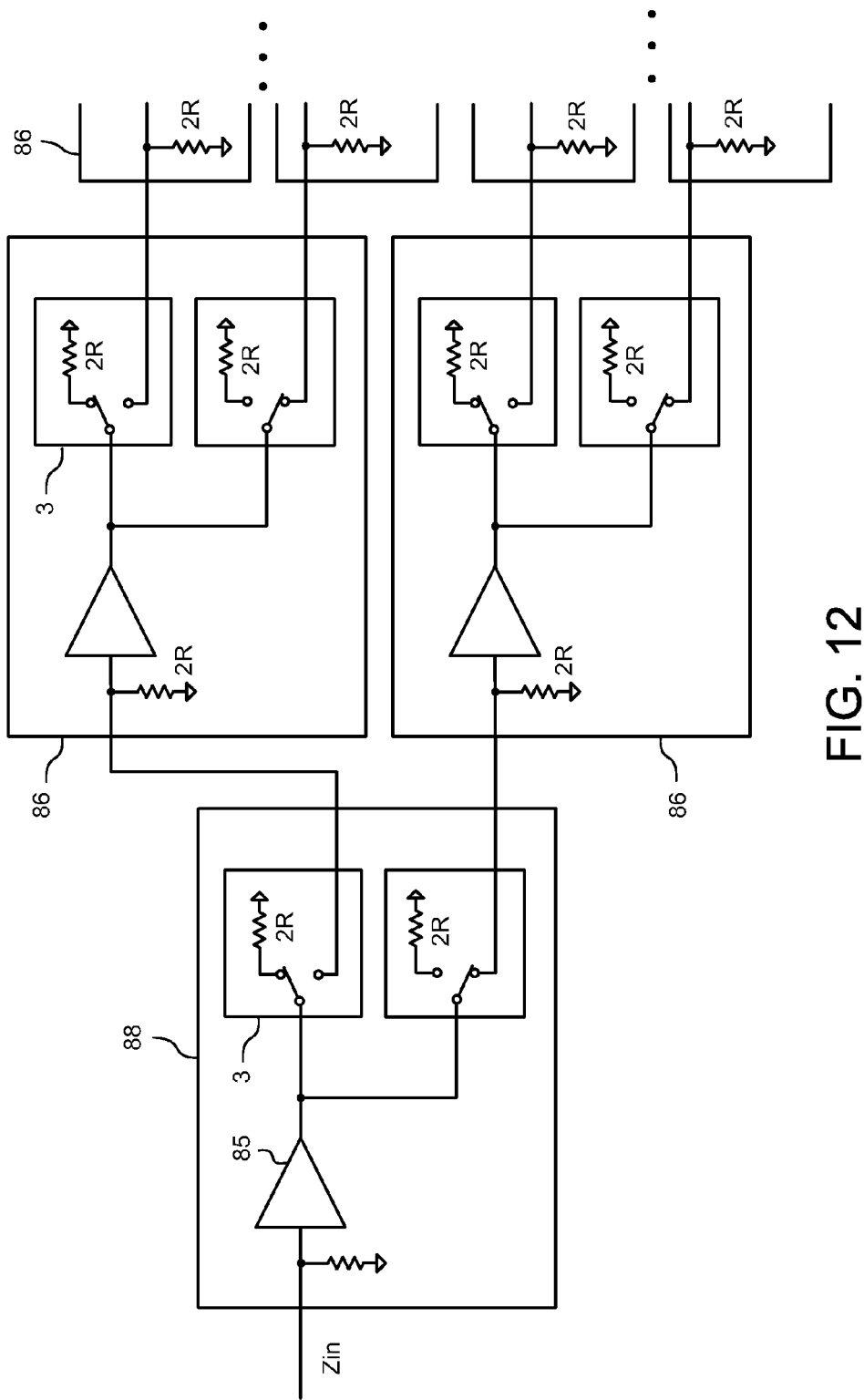
FIG. 12 is a block diagram of a multiplicity of the present invention switches connected in a "pyramid" arrangements.

FIG. 12 is a block diagram of a multiplicity of switches connected in a "pyramid" arrangement. Unlike the circuit of FIG. 11, the impedance in FIG. 12 scheme does not get reduced by the number of switches. In the first block 88 of the pyramid arrangement the value of the resistor coupled to the input is chosen to meet the desired system Zin. Block 86 uses a input resistor with a resistance value of 2R. Therefore, input impedance to the pyramid arrangement of switches is Zin and amplifier 85 of block 88 and each amplifier of block 86 see a load impedance equal to R. To save the hardware, only one pair of shared DACs controlling the transitional impedance of the multiplicity of switches, such as in the case of FIG. 11 and FIG. 12 can be used. In this case the shared pair of DACs is multiplexed between the switches, serving one at the time.

The signals received from different satellites can differ in power level. Even the signals from the same satellite of different polarization can have unequal levels. To achieve optimum performance, it is advantageous to equalize signal levels before switching in the matrix. This can be achieved by the means of AGC or power leveling circuitry, using variable gain and/or attenuation in the amplifier chain. Power leveling or AGC requires level detection and controlling of a variable gain or attenuator element.

Figure 13:
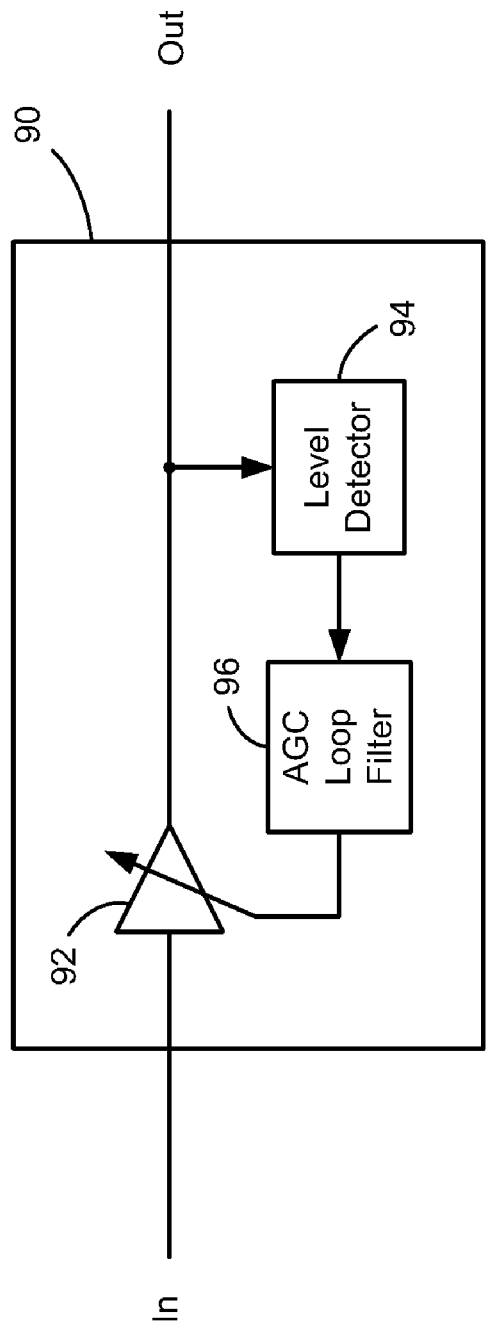
FIG. 13 is a simplified block diagram of an embodiment of the present invention amplifier in an AGC arrangement for signal power leveling utilizing internal variable gain amplifier.

FIG. 13 is a simplified block diagram of an amplifier in an AGC arrangement for signal power leveling utilizing an IC internal variable gain amplifier. Level detector 94 via loop filter/amplifier 96 controls a variable gain amplifier 92.

Figure 14:
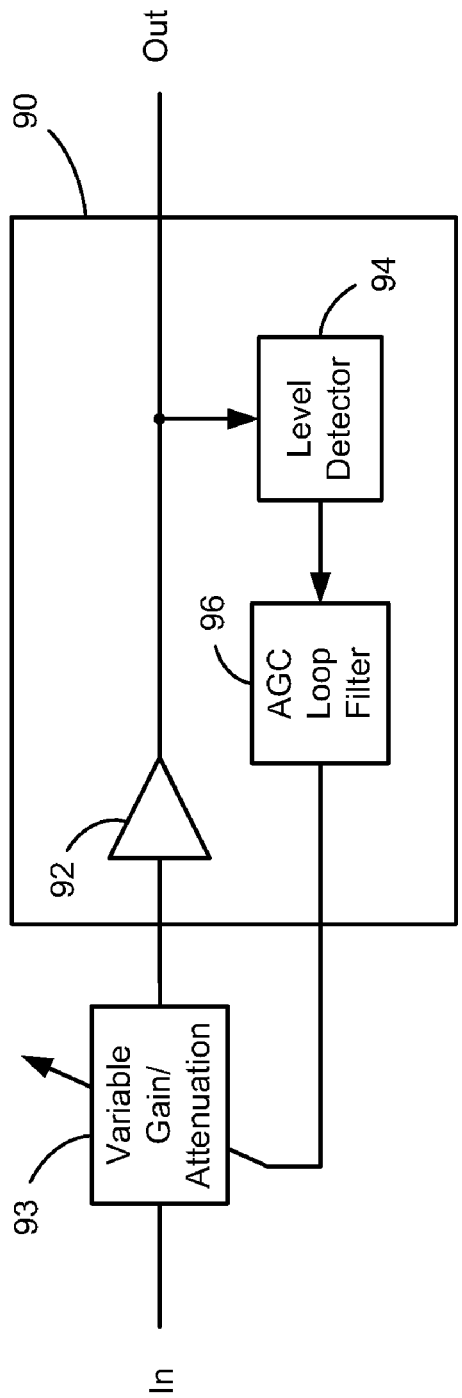
FIG. 14 is a simplified block diagram of an embodiment of the present invention amplifier in an AGC arrangement for signal power leveling utilizing external variable gain and/or attenuation.

FIG. 14 is a simplified block diagram of an amplifier in an AGC arrangement for signal power leveling utilizing an external variable gain and/or attenuation block 93. In this case the internal amplifier can have a fixed gain.

The amplifier 92 also serves as a buffer, improving the isolation and input matching. Each implementation of the present invention can have such input buffering for greater isolation.

The matrix switch 40 in FIG. 15 represents one embodiment of the present invention switch solution. It consists of an array of interconnected single-pole-double-throw (SPDT) switches 41 connected to the bus lines 43. The bus line 43 can physically be a single point or an electrically short length of a transmission line. Each input drives one bus line. The desired input to output routing is achieved by selecting the appropriate position of the SPDT switches. Since there is no isolation between the ports connected to the same bus (it is the same electrical point), the dynamic cross-talk could be more pronounced between those ports. The slow-speed switching method of the present invention described above mitigates this problem.

It may be possible to reduce the effects of impedance change during the switch-over of the matrix switch by replacing the bus 43 with signal splitters, such as a well known Wilkinson power dividers or similar. It is well known that power dividers provide isolation between the output ports and may isolate the effects of the nodal impedance changes. However, with this solution, complexity and insertion loss are increased.

Any of the matrix switch types described can be used interchangeably in all disclosed embodiments of the present invention circuits.

FIG. 16 is a block diagram of another embodiment of the present invention having the same input/output capability as the circuit shown in FIG. 15, with a difference in the downconversion block 48 where shared oscillators driving mixer pairs are used. The integrated circuit IC is a preferred embodiment of the mixers and shared oscillator.

The block diagram illustrated in FIG. 16 also utilizes a different matrix switch type 52. Matrix switch 52 uses active devices to drive the switches that are connected directly to the bus. Each bus is driven from one switch at the time and drives one output. In other embodiments of the matrix switch, the switch arrangements illustrated in either FIG. 11A and FIG. 12 can be used.

FIG. 16 shows an example of a common Ku band downlink frequency band as well as a standard intermediate frequency (IF) band. In the example, the downlink Ku frequency band 12.2 GHz to 12.7 GHz is downconverted to a standard satellite IF frequency range: 950-1450 MHz by mixing with the 11.25 GHz LO and 1650-2150 MHz by mixing with the 14.35 GHz LO.

FIG. 17 is a block diagram of another embodiment of a satellite band translation system for receiving input from two satellites using different type oscillators 53 in the downconverter block, which shows a 4 mixer block using 2 DRO-based local oscillators.

Figure 18:
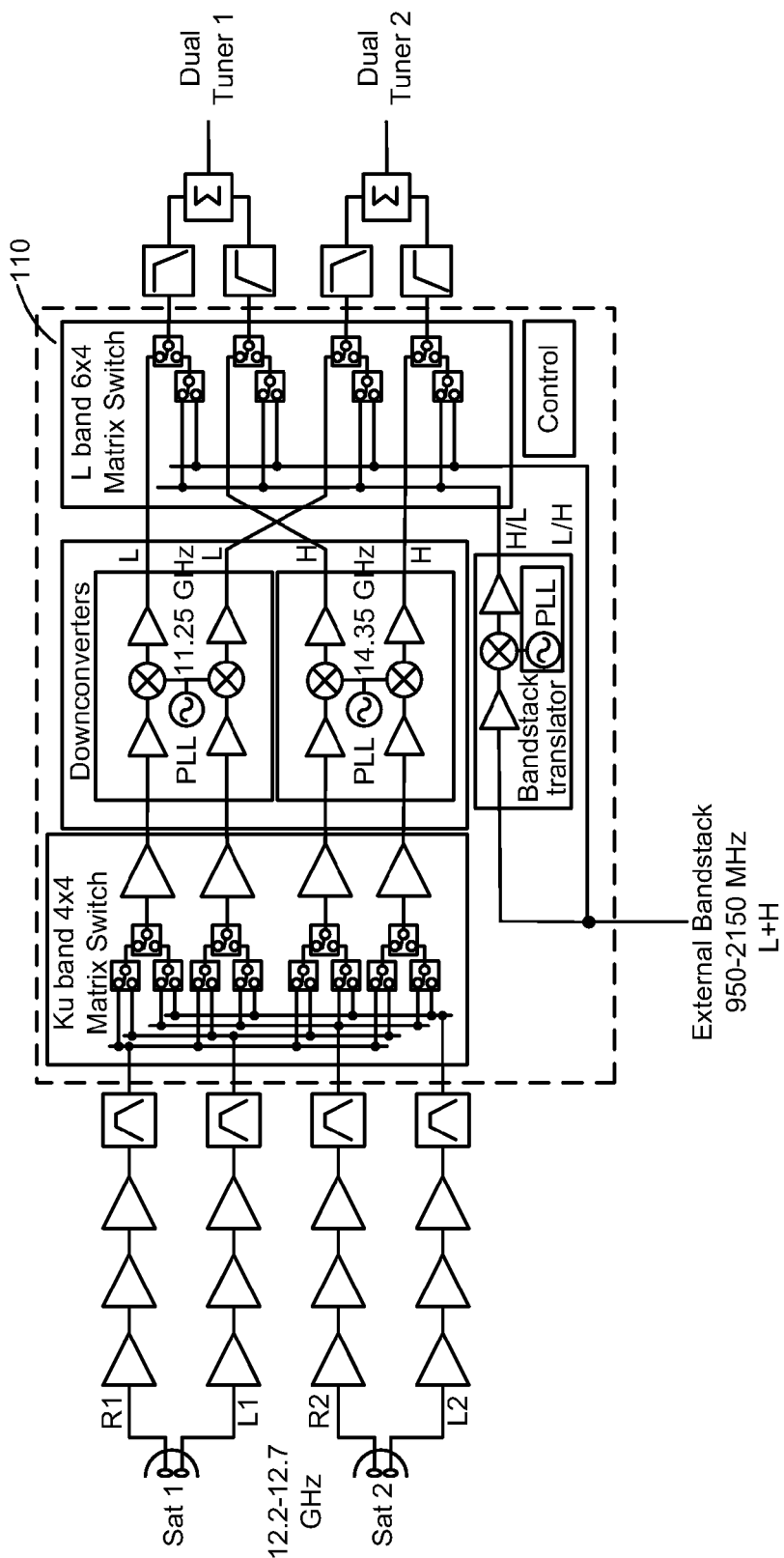
FIG. 18 is a block diagram of an implementation of the present invention using PLL-based LOs and having a separate external IF input.

FIG. 18 is a block diagram of another implementation of the present invention. In this implementation, an additional L-band 6×4 matrix switch 110 is used. FIG. 18 also shows additional circuitry for cases where an external input already at an IF frequency can be switched and outputted to the combiners by use of the additional 6×4 matrix switch.

Figure 19:
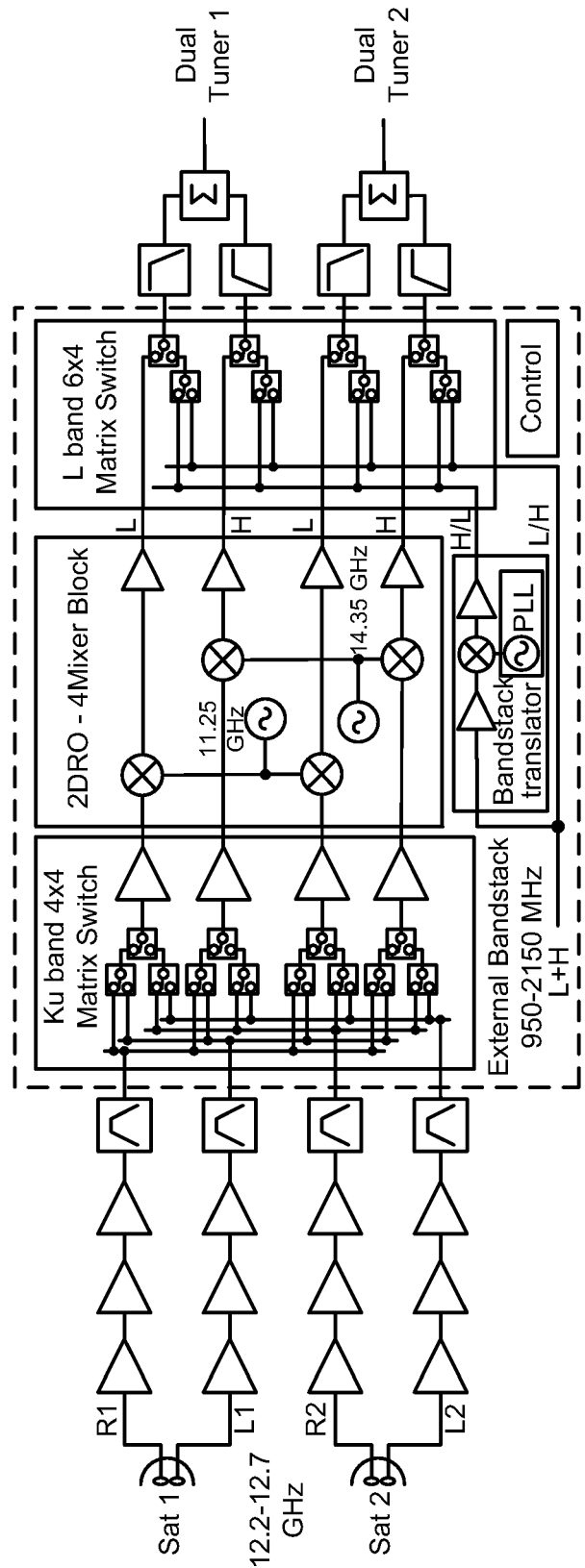
FIG. 19 is a block diagram of an implementation of the present invention using DRO-based LOs and having a separate external IF input.

FIG. 19 shows a circuit similar to FIG. 18 except the downconverter uses DRO-based local oscillators instead of PLL-based oscillators.

Figure 20:
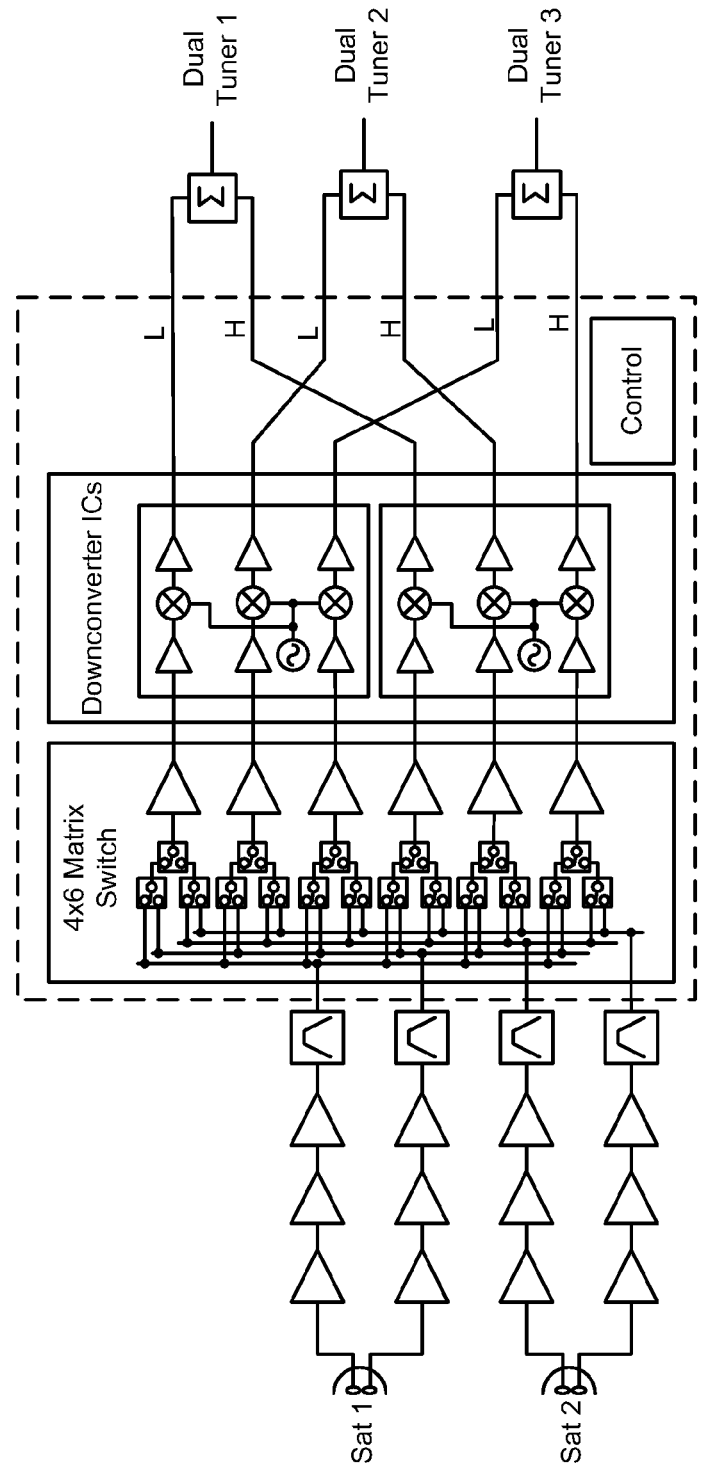
FIG. 20 is a block diagram of an implementation of the present invention having 3 outputs and where the downconverters have a shared LO between three mixers.

FIG. 20 illustrates the present invention for receiving inputs from two satellites, outputting to three dual tuners using a 4×6 matrix switch and two downconverters each with three mixers sharing one LO.

Figure 21:
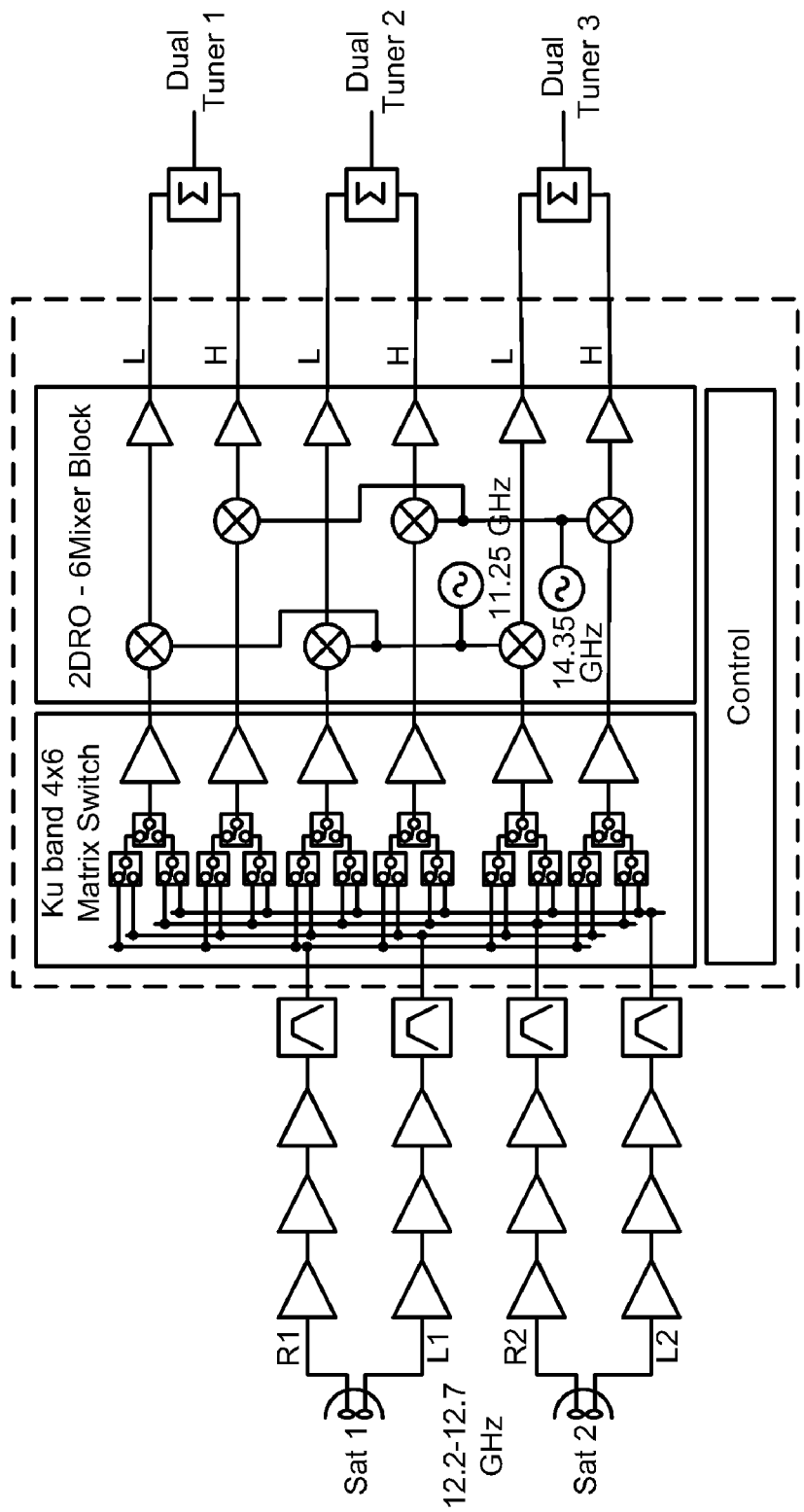
FIG. 21 is a block diagram of an implementation of the present invention having 3 outputs and the downconverters having DRO-based LOs.

FIG. 21 shows a similar implementation to that of FIG. 20 except the mixers are DRO-based.

Figure 22:
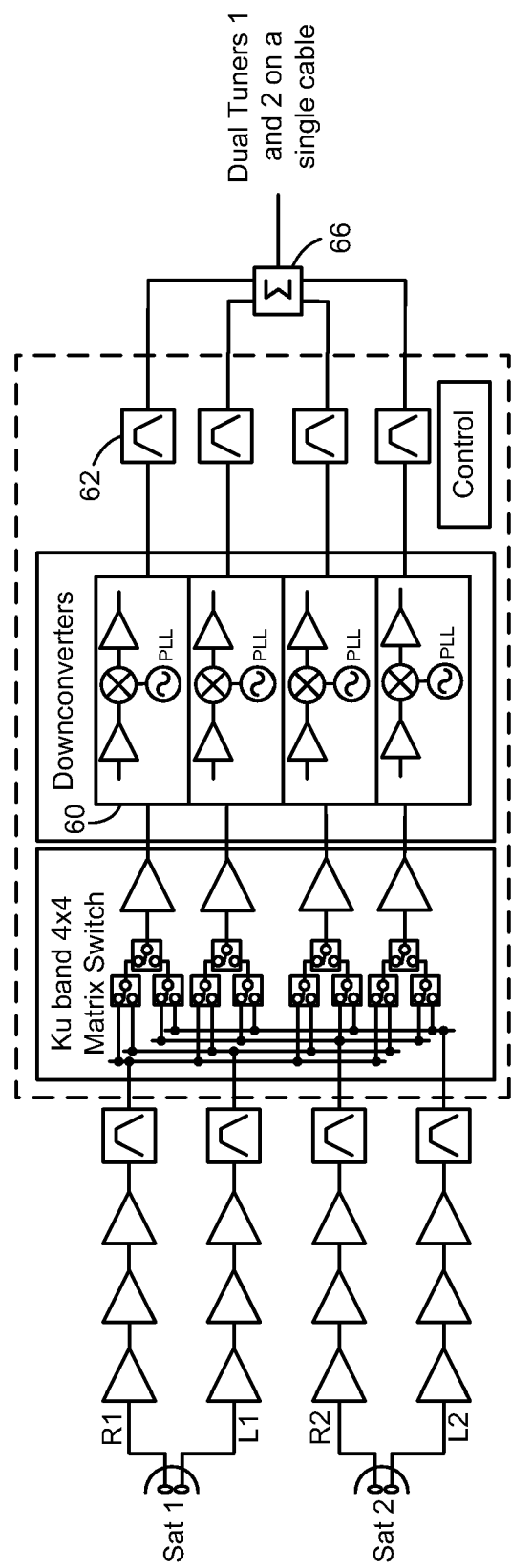
FIG. 22 is a block diagram of the channel stacking method of the present invention for use with two satellite inputs.

FIG. 22 is a block diagram of the channel stacking method of the present invention with four channels combined on a single cable using four bandpass filters each centered at different frequency within the tuner operating range. The downconverters are frequency agile downconverters.

Figure 23:
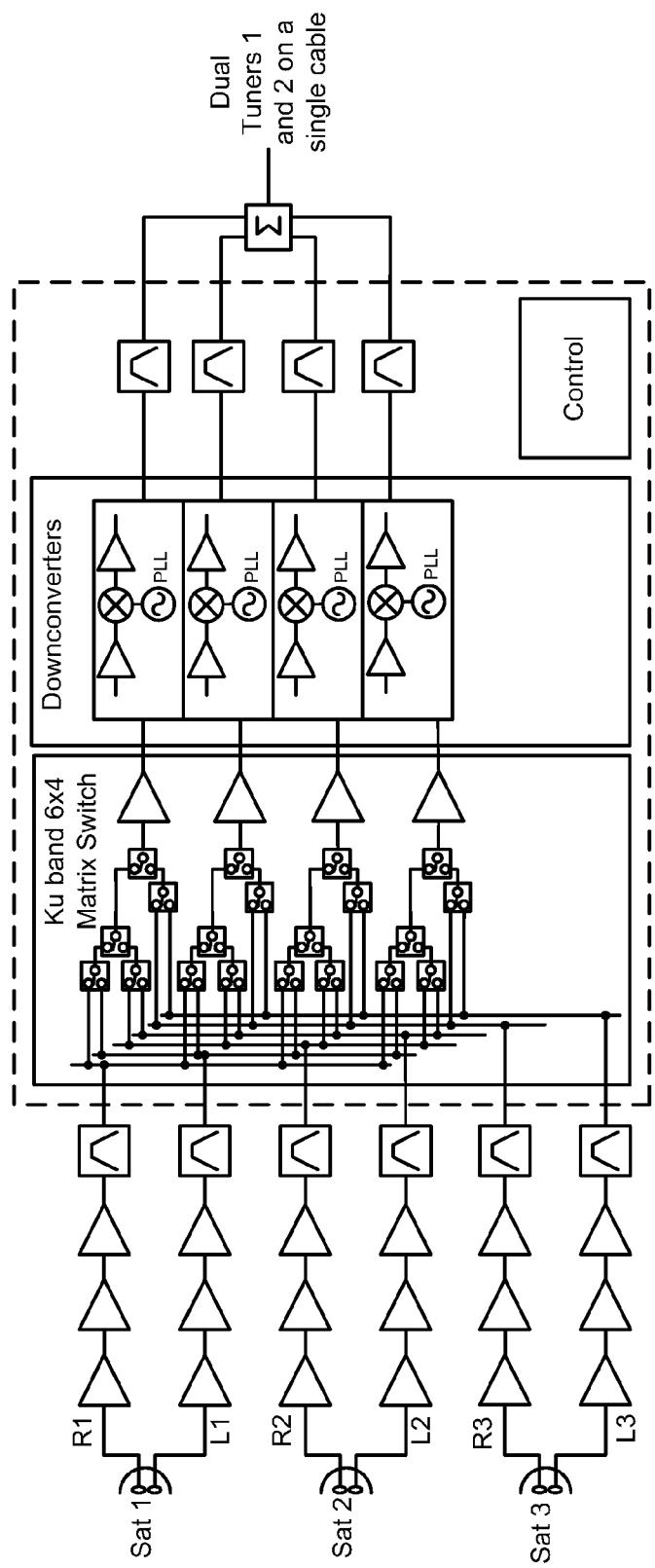
FIG. 23 is a block diagram of the channel stacking method of the present invention for use with three satellite inputs.

FIG. 23 is a block diagram of a circuit similar as FIG. 22, but for use with input signals from three satellites.

Figure 24:
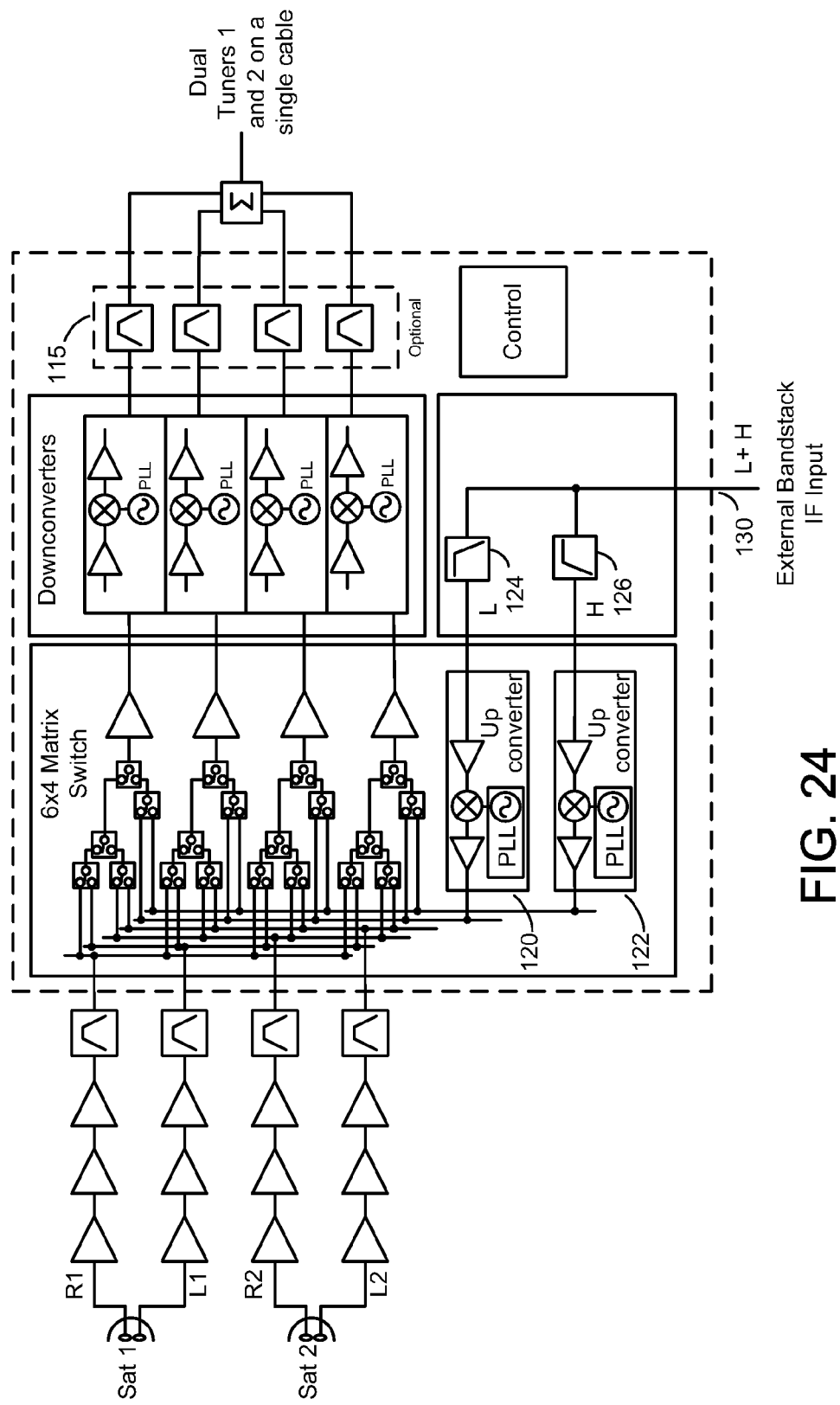
FIG. 24 is a block diagram of the channel stacking method of the present invention for use with two satellite inputs and an external IF input.

FIG. 24 is a block diagram of the channel stacking method of the present invention for use with two satellite inputs and an external IF input 130. The external IF signal is first filtered by filters 124 and 126, and then upconverted (circuits 120 and 122) to the same frequency band as the satellite signals (e.g. Ku or Ka band) and is then processed in the same way as another satellite input. This embodiment of the present invention eliminates the post-downconversion matrix switching. The phase noise may degrade due to re-conversion to high frequency. However, if the phase noise is dominated by the common PLL reference shared between the upconverters and downconverters, much of that noise will be undone or cancelled in the downconversion process, resulting in relatively small phase noise degradation. This will not be the case if DRO LO sources are used, in which case the noise of the DROs will be additive. Optional filter section 115 is used in channel stacked applications whereas for the band stack application, the filter section 115 generally do not need to be used.

Each implementation of the present invention described here can have enhanced performance with the addition of cross pole/leakage cancellation circuitry at the RF to remove undesired coupling at the switch. A technique for inference cancellation is provided in PCT application US 2007/072592, by Goldblatt, Bargroff and Petrovic, entitled "Satellite interference canceling", filed Jun. 29, 2007; application is subject to common assignment as of the present application and incorporated herein by reference.

What is claimed is:

1. A device for processing satellite signals comprising:
a first amplifier chain that receives a first RF signal;
a second amplifier chain that receives a second RF signal;
a first bandpass filter coupled to the output of the first amplifier chain;
a second bandpass filter coupled to the output of the second amplifier chain;
a matrix switch coupled to the outputs of the first bandpass filter and the second bandpass filter;
a frequency converter block coupled to the outputs of the matrix switch that outputs frequency converted signals;
a combiner coupled to the output of matrix switch that combines the frequency converted signals and produces a frequency stacked IF output wherein a single frequency conversion is performed between the RF input signals and the frequency stacked IF output;
a first output filter coupled to an output of the frequency converter block for selecting a first set of frequencies;
a second output filter coupled to another output of the frequency converter block for selecting a second set of frequencies wherein the outputs of first output filter and the second output filter are coupled to the inputs of the combiner.

2. A device for processing satellite signals comprising:
a first amplifier chain that receives a first RF signal;
a second amplifier chain that receives a second RF signal;
a first bandpass filter coupled to the output of the first amplifier chain;
a second bandpass filter coupled to the output of the second amplifier chain;
a matrix switch coupled to the outputs of the first bandpass filter and the second bandpass filter;
a frequency converter block coupled to the outputs of the matrix switch that outputs frequency converted signals;
a combiner coupled to the output of matrix switch that combines the frequency converted signals and produces a frequency stacked IF output wherein a single frequency conversion is performed between the RF input signals and the frequency stacked IF output;
a first output filter coupled to an output of the frequency converter block for selecting a first set of frequencies;
a second output filter coupled to another output of the frequency converter block for selecting a second set of frequencies wherein the outputs of the first output filter and the output of the second output filter are coupled to the inputs of the combiner.

3. A device for processing satellite signals comprising:
a first amplifier chain that receives a first RF signal;
a second amplifier chain that receives a second RF signal;
a first bandpass filter coupled to the output of the first amplifier chain;
a second bandpass filter coupled to the output of the second amplifier chain;
a matrix switch coupled to the outputs of the first bandpass filter and the second bandpass filter;
a frequency converter block coupled to the outputs of the matrix switch that outputs frequency converted signals;
a combiner coupled to the output of matrix switch that combines the frequency converted signals and produces a frequency stacked IF output wherein a single frequency conversion is performed between the RF input signals and the frequency stacked IF output;
a circuit for processing an external IF signal comprising:
an input for the external IF signal;
a high pass filter and a low pass filter wherein the external IF signal input is coupled to the input of both the high pass filter and the low pass filter;
the output of the high pass filter is coupled to the input of a first upconverter block; and
the output of the low pass filter is coupled to the input of a second upconverter block;
wherein the output of the first upconverter block and the second upconverter block are inputs to the matrix switch.

4. The device for processing satellite signals of claim 1 further comprising:
an input for the external IF signal;
a high pass filter and a low pass filter wherein the external IF signal input is coupled to the input of both the high pass filter and the low pass filter;
the output of the low pass filter is coupled to the input of a second upconverter block;
wherein the outputs of the first upconverter block and the second upconverter block are input to the matrix switch.

5. The device for processing satellite signals of claim 1 further comprising:
a circuit for processing an external IF signal; and
a second matrix switch coupled to the output of the frequency converter block and the output of the external IF signal processing circuit wherein the output of the second matrix switch is coupled to the inputs of both the first output filter and the second output filter.

6. A device for processing satellite signals comprising:
a first amplifier chain that receives a first RF signal and comprises means for adjusting the power level of the output of the first amplifier chain;
a second amplifier chain that receives a second RF signal and comprises means for adjusting the power level of the output of the second amplifier chain wherein the output of the first amplifier chain and the output of the second amplifier chain are substantially equal;
a first bandpass filter coupled to the output of the first amplifier chain;
a second bandpass filter coupled to the output of the second amplifier chain;
a matrix switch coupled to the outputs of the first bandpass filter and the second bandpass filter;
a frequency converter block coupled to the outputs of the matrix switch that outputs frequency converted signals; and
a combiner coupled to the output of matrix switch that combines the frequency converted signals and produces a frequency stacked IF output wherein a single frequency conversion is performed between the RF input signals and the frequency stacked IF output.

7. A device comprising:
a first amplifier chain that receives a first RF signal;
a second amplifier chain that receives a second RF signal;
a first bandpass filter coupled to the output of the first amplifier chain;
a second bandpass filter coupled to the output of the second amplifier chain;
a matrix switch coupled to the outputs of the first bandpass filter and the second bandpass filter, the matrix switch comprising signal switches wherein the transition between switch states is slowed down to allow tracking loops in a system receiving processed satellite signals to track out the signal change caused by the switching;
a frequency converter block coupled to the outputs of the matrix switch that outputs frequency converted signals;
a combiner coupled to the output of matrix switch that combines the frequency converted signals and produces a frequency stacked IF output wherein a single frequency conversion is performed between the RF input signals and the frequency stacked IF output.

8. A device comprising:
a first amplifier chain that receives a first RF signal;
a second amplifier chain that receives a second RF signal;
a first bandpass filter coupled to the output of the first amplifier chain;
a second bandpass filter coupled to the output of the second amplifier chain;
a matrix switch coupled to the outputs of the first bandpass filter and the second bandpass filter, the matrix switch comprising signal switches that maintain substantially constant input impedances and transition between switch states is slowed down to allow tracking loops in a system receiving processed satellite signals to track out the signal change caused by the switching;
a frequency converter block coupled to the outputs of the matrix switch that outputs frequency converted signals;
a combiner coupled to the output of matrix switch that combines the frequency converted signals and produces a frequency stacked IF output wherein a single frequency conversion is performed between the RF input signals and the frequency stacked IF output.

* * * * *